US012065310B2

(12) United States Patent
Rongley

(10) Patent No.: US 12,065,310 B2
(45) Date of Patent: Aug. 20, 2024

(54) SYSTEMS, METHODS, COMPUTING PLATFORMS, AND STORAGE MEDIA FOR CONTROLLING AN AUTONOMOUS INVENTORY MANAGEMENT SYSTEM

(71) Applicant: Autonomous Shelf, Inc., Denver, CO (US)

(72) Inventor: Eric Rongley, Golden, CO (US)

(73) Assignee: Prime Robotics Inc., Denver, CO (US)

( * ) Notice: Subject to any disclaimer, the term of this patent is extended or adjusted under 35 U.S.C. 154(b) by 704 days.

(21) Appl. No.: 17/335,533

(22) Filed: Jun. 1, 2021

(65) Prior Publication Data

US 2022/0009715 A1    Jan. 13, 2022

Related U.S. Application Data

(60) Provisional application No. 63/033,684, filed on Jun. 2, 2020.

(51) Int. Cl.
  *B65G 1/137*  (2006.01)
  *G05D 1/00*  (2006.01)
  *G06Q 10/087*  (2023.01)

(52) U.S. Cl.
  CPC ........... *B65G 1/137* (2013.01); *G05D 1/0212* (2013.01); *G06Q 10/087* (2013.01)

(58) Field of Classification Search
  CPC ..... B65G 1/137; G05D 1/0212; G06Q 10/087
  See application file for complete search history.

(56) References Cited

U.S. PATENT DOCUMENTS

| 6,748,292 B2 | 6/2004 | Mountz |
| 6,819,218 B2 | 11/2004 | Mabuchi et al. |
| 6,950,722 B2 | 9/2005 | Mountz |
| 7,243,001 B2 | 7/2007 | Janert et al. |
| 7,402,018 B2 | 7/2008 | Mountz et al. |

(Continued)

FOREIGN PATENT DOCUMENTS

| CA | 2936393 A1 | 1/2017 |
| CN | 2726446 Y | 9/2005 |

(Continued)

OTHER PUBLICATIONS

International Preliminary Report on Patentability received for International PCT Application Serial No. PCT/US2021/021482 dated Sep. 6, 2022, 10 pages.

(Continued)

*Primary Examiner* — Kyle O Logan
(74) *Attorney, Agent, or Firm* — Neugeboren O'Dowd PC

(57) ABSTRACT

Systems, methods, computing platforms, and storage media for controlling an autonomous inventory management system are disclosed. Exemplary implementations may: direct a first transport system to a first location; determine a respective drop off location for each of the one or more autonomous storage units; determine a boarding order for the one or more autonomous storage units based at least in part on the respective drop off location for each of the one or more autonomous storage units; direct the one or more autonomous storage units to board the first transport system at the first location; and transport the one or more autonomous storage units from the first location to the one or more respective drop off locations.

20 Claims, 9 Drawing Sheets

(56) References Cited

U.S. PATENT DOCUMENTS

| | | |
|---|---|---|
| 7,850,413 B2 | 12/2010 | Fontana |
| 7,881,820 B2 | 2/2011 | Antony et al. |
| 7,894,933 B2 | 2/2011 | Mountz et al. |
| 7,912,574 B2 | 3/2011 | Wurman et al. |
| 7,920,962 B2 | 4/2011 | D'Andrea et al. |
| 8,086,344 B1 | 12/2011 | Mishra et al. |
| 8,103,377 B1 | 1/2012 | Wong et al. |
| 8,220,710 B2 | 7/2012 | Hoffman et al. |
| 8,234,006 B1 | 7/2012 | Sachar et al. |
| 8,239,291 B2 | 8/2012 | Hoffman et al. |
| 8,265,873 B2 | 9/2012 | D'Andrea et al. |
| 8,280,547 B2 | 10/2012 | D'Andrea et al. |
| 8,306,650 B1 | 11/2012 | Antony et al. |
| 8,326,452 B2 | 12/2012 | Somin et al. |
| 8,433,437 B1 | 4/2013 | Shakes et al. |
| 8,527,325 B1 | 9/2013 | Atreya et al. |
| 8,594,834 B1 | 11/2013 | Clark et al. |
| 8,606,392 B2 | 12/2013 | Wurman et al. |
| 8,626,335 B2 | 1/2014 | Wurman et al. |
| 8,639,382 B1 | 1/2014 | Clark et al. |
| 8,718,814 B1 | 5/2014 | Clark et al. |
| 8,798,784 B1 | 8/2014 | Clark et al. |
| 8,798,786 B2 | 8/2014 | Wurman et al. |
| 8,805,573 B2 | 8/2014 | Brunner et al. |
| 8,805,574 B2 | 8/2014 | Stevens et al. |
| 8,825,197 B1 | 9/2014 | Guan |
| 8,831,984 B2 | 9/2014 | Hoffman et al. |
| 8,892,240 B1 | 11/2014 | Vliet et al. |
| 8,909,368 B2 | 12/2014 | D'Andrea et al. |
| 8,930,133 B2 | 1/2015 | Wurman et al. |
| 8,958,903 B1 | 2/2015 | Rotella et al. |
| 8,965,562 B1 | 2/2015 | Wurman et al. |
| 8,972,045 B1 | 3/2015 | Mountz et al. |
| 9,008,827 B1 | 4/2015 | Dwarakanath et al. |
| 9,008,829 B2 | 4/2015 | Worsley |
| 9,365,348 B1 * | 6/2016 | Agarwal ............. G06Q 10/087 |
| 9,656,805 B1 | 5/2017 | Evans et al. |
| 9,764,836 B1 | 9/2017 | Elzinga et al. |
| 9,916,562 B1 | 3/2018 | Armato |
| 10,121,119 B2 * | 11/2018 | Haverinen ............. H04W 4/33 |
| 10,222,798 B1 | 3/2019 | Brady et al. |
| 10,303,171 B1 | 5/2019 | Brady et al. |
| 11,308,444 B2 | 4/2022 | Rongley |
| 11,520,337 B2 | 12/2022 | Rongley |
| 2004/0093116 A1 | 5/2004 | Mountz |
| 2007/0080000 A1 | 4/2007 | Tobey et al. |
| 2008/0040182 A1 | 2/2008 | Wegner et al. |
| 2008/0167884 A1 | 7/2008 | Mountz et al. |
| 2011/0103924 A1 | 5/2011 | Watt et al. |
| 2011/0153063 A1 | 6/2011 | Wurman et al. |
| 2011/0320322 A1 | 12/2011 | Roslak |
| 2012/0066626 A1 | 3/2012 | Geleijnse |
| 2013/0054005 A1 | 2/2013 | Stevens et al. |
| 2013/0103552 A1 | 4/2013 | Hoffman et al. |
| 2013/0173049 A1 | 7/2013 | Brunner et al. |
| 2014/0046585 A1 | 2/2014 | Morris et al. |
| 2014/0195040 A1 | 7/2014 | Wurman et al. |
| 2014/0297470 A1 * | 10/2014 | Ramadge ........... G06Q 30/0635 705/26.41 |
| 2014/0350831 A1 | 11/2014 | Hoffman et al. |
| 2015/0073589 A1 | 3/2015 | Khodl et al. |
| 2015/0151912 A1 | 6/2015 | Mountz et al. |
| 2015/0151913 A1 | 6/2015 | Wong et al. |
| 2015/0202770 A1 | 7/2015 | Patron et al. |
| 2015/0324735 A1 | 11/2015 | Lord et al. |
| 2015/0336270 A1 | 11/2015 | Storr |
| 2015/0353280 A1 | 12/2015 | Brazeau et al. |
| 2015/0353282 A1 | 12/2015 | Mansfield et al. |
| 2016/0019497 A1 | 1/2016 | Carvajal |
| 2016/0132059 A1 | 5/2016 | Mason et al. |
| 2016/0236867 A1 | 8/2016 | Brazeau et al. |
| 2016/0257401 A1 | 9/2016 | Buchmueller et al. |
| 2016/0292634 A1 | 10/2016 | Mehring et al. |
| 2017/0061371 A1 * | 3/2017 | Haverinen ............. H04W 4/33 |
| 2017/0088360 A1 | 3/2017 | Brazeau et al. |
| 2017/0136931 A1 | 5/2017 | Colantonio et al. |
| 2017/0161486 A1 | 6/2017 | Jeon et al. |
| 2017/0217683 A1 | 8/2017 | Lyon et al. |
| 2017/0293294 A1 | 10/2017 | Atchley et al. |
| 2018/0024554 A1 | 1/2018 | Brady et al. |
| 2018/0032949 A1 | 2/2018 | Galluzzo et al. |
| 2018/0058739 A1 | 3/2018 | Zou |
| 2018/0074504 A1 | 3/2018 | Shydo, Jr. |
| 2018/0086353 A1 | 3/2018 | Holbrooke et al. |
| 2018/0086561 A1 | 3/2018 | Stubbs et al. |
| 2018/0189724 A1 | 7/2018 | Mattingly |
| 2018/0357848 A1 | 12/2018 | McLellan et al. |
| 2019/0050805 A1 | 2/2019 | Munafo et al. |
| 2019/0072979 A1 | 3/2019 | Sukhomlinov et al. |
| 2020/0065748 A1 | 2/2020 | Durkee et al. |
| 2020/0078936 A1 * | 3/2020 | Wu .................. B25J 9/1697 |
| 2020/0122927 A1 | 4/2020 | Bellar et al. |
| 2020/0219348 A1 | 7/2020 | Hanlon |
| 2020/0225665 A1 | 7/2020 | Rongley |
| 2020/0364652 A1 | 11/2020 | Rongley |
| 2020/0364653 A1 | 11/2020 | Rongley |
| 2021/0073716 A1 | 3/2021 | Dearing |
| 2021/0276805 A1 | 9/2021 | Rongley |
| 2021/0395012 A1 * | 12/2021 | Liu .................. B65G 1/10 |
| 2022/0012677 A1 | 1/2022 | Rongley |
| 2022/0351118 A1 | 11/2022 | Rongley |
| 2023/0244236 A1 | 8/2023 | Rongley |
| 2024/0077870 A1 * | 3/2024 | Park .................. G05D 1/0246 |

FOREIGN PATENT DOCUMENTS

| | | |
|---|---|---|
| CN | 203020893 U | 6/2013 |
| CN | 105314315 B | 12/2017 |
| CN | 206975763 U | 2/2018 |
| EP | 2136329 A2 | 12/2009 |
| EP | 1590272 B1 | 8/2010 |
| KR | 20190070700 A | 6/2019 |
| WO | 2007149194 A2 | 12/2007 |
| WO | 2007149703 A2 | 12/2007 |
| WO | 2020123445 A1 | 6/2020 |
| WO | 2020227379 A1 | 11/2020 |
| WO | 2020227381 A1 | 11/2020 |

OTHER PUBLICATIONS

Shead, Sam, "Amazon now has 45,000 robots in its warehouses", Business Insider, Jan. 3, 2017, https://www.businessinsider.com/amazons-robot-army-has-grown-by-50-2017-1 (Year: 2017).

Non Final Office Action received for U.S. Appl. No. 16/867,707 dated Oct. 27, 2022, 20 pages.

Non Final Office Action received for U.S. Appl. No. 17/335,541 dated Dec. 19, 2022, 47 pages.

Non Final Office Action received for U.S. Appl. No. 17/196,195 dated Jul. 17, 2023, 14 pages.

Non Final Office Action received for U.S. Appl. No. 18/075,095 dated Aug. 2, 2023, 27 pages.

Notice of Allowance received for U.S. Appl. No. 16/867,707 dated Jun. 9, 2023, 13 pages.

Notice of Allowance received for U.S. Appl. No. 16/708,618 dated Aug. 4, 2022, 25 pages.

"Automated Load Measuring System", Cast Engineering, ALMS, 2016, 4 pages, Online available at <https://fuelmonitoring.org>, 2016.

Final Office Action received for U.S. Appl. No. 16/708,618 dated Apr. 25, 2022, 82 pages.

International Preliminary Report on Patentability received for International PCT Application Serial No. PCT/US2019/065377 dated Jun. 24, 2021, 15 pages.

International Preliminary Report on Patentability received for International PCT Application Serial No. PCT/US2020/031631 dated Nov. 18, 2021, 9 pages.

International Preliminary Report on Patentability received for International PCT Application Serial No. PCT/US2020/031634 dated Nov. 18, 2021, 8 pages.

(56) References Cited

OTHER PUBLICATIONS

Notice of Allowance received for U.S. Appl. No. 16/867,711 dated Dec. 14, 2021, 42 pages.
Raj et al., "Analyzing Critical Success Factors for Implementation of Drones in the Logistics Sector using Grey-DEMATEL Based Approach", Computers and Industrial Engineering, vol. 138, No. 106118, 12 pages, 2019.
Response filed on Jan. 6, 2022 for Non Final Office Action of U.S. Appl. No. 16/708,618 Mail received dated Jul. 7, 2021, 25 pages.
Response filed on Oct. 1, 2021 for Non Final Office Action of U.S. Appl. No. 16/867,711 Mail received dated Apr. 1, 2021, 25 pages.
Cooley, Chase Littlejohn, "Office Action Regarding U.S. Appl. No. 16/708,618", Jul. 7, 2021, pp. 56, Published in: US.
Young, Lee, "International Search Report and Written Opinion Regarding International Application No. PCT/US2019/65377", Mar. 30, 2020, p. 23, Published in: US.
Thomas, Shane, "International Search Report and Written Opion Regarding International Application No. PCT/US20/31634", Aug. 7, 2020, p. 9, Published in: US.
Bruner, Nicole Elena, "Office Action Regarding U.S. Appl. No. 16/867,711", Apr. 1, 2021, p. 49, Published in: US.
Lee Young, "International Search Report and Written Opinion Regarding International Application No. PCT/US20/31631", Aug. 4, 2020, p. 16, Published in: US.
Thomas, Shane, "International Search Report and Written Opinion Regarding International Application No. PCT/US21/21482", Jul. 19, 2021, p. 25, Published in: US.
Aruniosmo, $Sin^{\wedge}2 + Cos^{\wedge}2 = 1$, 2016, youtube, https://www.youtube.com/watch?v=OFGWKwllKVM&t=54s, 2:00-3:00 (Year: 2016).
Final Office Action received for U.S. Appl. No. 18/075,095 dated Feb. 1, 2024, 19 pages.
Raymond, Seth, Wireless Power and Data Transfer Using Inductively Resonant Coils, 2016, University of Maine, pp. 1-6 (Year: 2016).
Wulfraat, Marc, Locus Robotics—An Independent Consultant Review of Autonomous Robots in Fulfillment Centers, 2017, mwpvl.com, pp. 1-3 (Year: 2017).

\* cited by examiner

SYSTEMS, METHODS, COMPUTING PLATFORMS, AND STORAGE MEDIA FOR CONTROLLING AN AUTONOMOUS INVENTORY MANAGEMENT SYSTEM

PRIORITY AND CROSS-REFERENCE TO RELATED APPLICATIONS

The present application for Patent claims priority to U.S. Provisional Application No. 63/033,684 entitled "Systems, Methods, Computing Platforms, and Storage Media for Controlling an Autonomous Inventory Management System," filed Jun. 2, 2020, and assigned to the assignee hereof, and the contents of which are incorporated herein by reference in their entirety and for all proper purposes. The present application is related to U.S. Provisional Application Ser. No. 62/986,919 the contents of which are incorporated herein by reference in their entirety and for all proper purposes. The present application is also related to U.S. Non-Provisional application Ser. Nos. 16/708,618; 16/867,707; and 16/867,711, the contents of which are incorporated herein by reference in their entirety and for all proper purposes.

FIELD OF THE DISCLOSURE

The present disclosure relates to systems, methods, computing platforms, and storage media for controlling an autonomous inventory management system.

BACKGROUND

While automation has contributed to lower costs and higher uptimes in supply chains, the rigidity and lack of awareness of current automation systems also presents numerous problems. In some cases, the centralized nature of the logic architecture controlling the robot fleets and/or transportation systems carrying said robots lacks scalability and leads to increased latency. For instance, current automation hardware relies on a set of instructions received from a central processing system for transporting goods. However, technological challenges arise when an autonomous operation is required from the automation system in conjunction with additional tasks, such as when an autonomous response to inventory demands is needed along with the transportation of goods. The limited capability of current robots and transportation systems to adapt logistically within the same or a different geographic site, particularly in response to inventory demands, has prevented automation systems from expanding beyond their currently limited.

Logistics capability aside, current techniques for supply chain automation systems include robots and transportation systems with limited intelligence and functionality. In some cases, such robots are configured to dock with specially modified shelves by driving under them, lifting them up, and transporting them from one point to another. While these robots have brought about some advances in inventory handling and transport, the shelves themselves have not evolved much. In other words, the shelves utilized in current warehouse automation systems have no added functionality beyond providing storage space for inventory. It should be noted, however, that these robots are in no way "intelligent", since they are not only unaware of the inventory they are carrying and transporting (e.g., inventory levels of different items), but also any goals or targets pertaining to that inventory (e.g., varying priorities for different inventory requests/demands, sensitivity of inventory to vibrations, temperature, light, etc.). Furthermore, transportation systems, such as trucks, require constant input (i.e., from a human or a central server) while transporting robots between different geographic areas, which is not only time consuming but also resource intensive.

Thus, there is a need for improved techniques for directing and controlling an autonomous inventory management system.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below. It should be noted that the terms "robot", "autonomous storage unit", "autonomous inventory storage unit", "inventory storage robot", "autonomous inventory robot", or "mobile inventory transportation unit (MITU)" may be used interchangeably throughout this application and may be applied to similar systems outside of the warehouse, retail, and/or supply chain industry. Further, the terms "transport system", "transportation system", "truck", "transport unit", "transportation unit", or "transporter" may be used interchangeably throughout this application. Lastly, the terms "central system", "central server", "control system", or "controller" may be used interchangeably throughout this application.

In order to address the deficiencies in the current technology, disclosed herein is a system and a method for controlling an autonomous inventory management system. The present disclosure is generally directed to a transportation system configured for transporting autonomous storage units between different locations or geographic regions. In some examples, such locations may be across a single warehouse. In some other examples, such locations could extend across a larger geographic area, such as a city, state, or even a country. For instance, a transportation system may be configured to transport an autonomous storage unit from a warehouse in city A to a first retail location within city A, or even a second retail location in city B.

One aspect of the present disclosure relates to a system configured for controlling an autonomous inventory management system. The system may include one or more hardware processors configured by machine-readable instructions. The processor(s) may be configured to direct a first transport system to a first location. The first transport system may be configured to transport one or more autonomous storage units from the first location. Each of the one or more autonomous storage units may be configured to transport at least one inventory item. In some cases, the at least one inventory item may be a respective autonomous storage unit. That is, an autonomous storage unit may itself be the inventory. The processor(s) may be configured to determine a respective drop off location for each of the one or more autonomous storage units. The drop off location may be different from the first location. The processor(s) may be configured to determine a boarding order for the one or more autonomous storage units based at least in part on the respective drop off location for each of the one or more autonomous storage units. The processor(s) may be configured to direct the one or more autonomous storage units to board the first transport system at the first location. The directing may be based at least in part on the boarding order. The processor(s) may be configured to transport the one or more autonomous storage units from the first location to the one or more respective drop off locations. In some embodiments, the first location is one of a first distribution center, a first retail location, a first residential property, or a first maintenance center. Further, the drop off location may be one of a second retail location, another maintenance center different from the first maintenance center, a second residential property, or another distribution center different from the first distribution center. In some embodiments, the drop off location may be a street address, street intersection (or street corner), a sidewalk on a street, a public venue (e.g., a sports stadium, concert hall), a school, a college or university (e.g., a dorm, a cafeteria, etc.), a hospital, or any other applicable location where an autonomous storage unit may operate. In some examples, each of the one or more autonomous storage units comprises a housing, an inventory storage device physically coupled to the housing, and configured to transport the at least one inventory item, a power device, wherein the power device is operationally configured to supply power to electrical components of the autonomous storage unit, a drive device in electrical communication with the power device, the drive device operationally configured to physically move the autonomous storage unit in one or more control territories, and one or more of: a navigation device operationally configured to transmit and receive geographic data and determine a physical location of the autonomous storage unit, a sensing device operationally configured to detect physical objects and transmit and receive physical object data, and a control device, wherein the control device is in electronic communication with the power device, the drive device, and one or more of the navigation device and the sensing device, and is operationally configured to control the autonomous storage unit.

Another aspect of the present disclosure relates to a method for controlling an autonomous inventory management system. The method may include directing a first transport system to a first location. The first transport system may be configured to transport one or more autonomous storage units from the first location. Each of the one or more autonomous storage units may be configured to transport at least one inventory item. In some examples, each of the one or more autonomous storage units comprises a housing, an inventory storage device physically coupled to the housing, and configured to transport the at least one inventory item, a power device, wherein the power device is operationally configured to supply power to electrical components of the autonomous storage unit, a drive device in electrical communication with the power device, the drive device operationally configured to physically move the autonomous storage unit in one or more control territories, and one or more of: a navigation device operationally configured to transmit and receive geographic data and determine a physical location of the autonomous storage unit, a sensing device operationally configured to detect physical objects and transmit and receive physical object data, and a control device, wherein the control device is in electronic communication with the power device, the drive device, and one or more of the navigation device and the sensing device, and is operationally configured to control the autonomous storage unit. In some cases, the at least one inventory item may be a respective autonomous storage unit. The method may include determining a respective drop off location for each of the one or more autonomous storage units. The drop off location may be different from the first location. The method may include determining a boarding order for the one or more autonomous storage units based at least in part on the respective drop off location for each of the one or more autonomous storage units. The method may include directing the one or more autonomous storage units to board the first transport system at the first location. The directing may be based at least in part on the boarding order. The method may include transporting the one or more autonomous storage units from the first location to the one or more respective drop off locations. In some embodiments, the first location is one of a first distribution center, a first retail location, a first residential property, or a first maintenance center. Further, the drop off location may be one of a second retail location, another maintenance center different from the first maintenance center, a second residential property, another distribution center different from the first distribution center, a street address, street intersection (or street corner), a sidewalk on a street, a public venue (e.g., a sports stadium, concert hall), a school, a college or university (e.g., a dorm, a cafeteria, etc.), a hospital, or any other applicable location where an autonomous storage unit may operate.

Yet another aspect of the present disclosure relates to a computing platform configured for controlling an autonomous inventory management system. The computing platform may include a non-transient computer-readable storage medium having executable instructions embodied thereon. The computing platform may include one or more hardware processors configured to execute the instructions. The processor(s) may execute the instructions to direct a first transport system to a first location. The first transport system may be configured to transport one or more autonomous storage units from the first location. Each of the one or more autonomous storage units may be configured to transport at least one inventory item. In some examples, each of the one or more autonomous storage units comprises a housing, an inventory storage device physically coupled to the housing, and configured to transport the at least one inventory item, a power device, wherein the power device is operationally configured to supply power to electrical components of the autonomous storage unit, a drive device in electrical communication with the power device, the drive device operationally configured to physically move the autonomous storage unit in one or more control territories, and one or more of: a navigation device operationally configured to transmit and receive geographic data and determine a physical location of the autonomous storage unit, a sensing device operationally configured to detect physical objects and transmit and receive physical object data, and a control device, wherein the control device is in electronic communication with the power device, the drive device, and one or more of the navigation device and the sensing device, and is operationally configured to control the autonomous storage unit. In some cases, the at least one inventory item may be a respective autonomous storage unit. The processor(s) may execute the instructions to determine a respective drop off location for each of the one or more autonomous storage units. The drop off location may be different from the first location. The processor(s) may execute the instructions to determine a boarding order for the one or more autonomous storage units based at least in part on the respective drop off location for each of the one or more autonomous storage units. The processor(s) may execute the instructions to direct the one or more autonomous storage units to board the first transport system at the first location. The directing may be based at least in part on the boarding order. The processor(s) may execute the instructions to transport the one or more autonomous storage units from the first location to the one or more respective drop off locations. In some embodiments, the first location is one of a first distribution center, a first retail location, a first residential property, a first maintenance center, a first geolocation or Global Positioning System (GPS) coordinate, or a street address (e.g., street intersection, one or more street blocks, etc.). Further, the drop off location may be one of a second retail location, another maintenance center different from the first maintenance center, a second geolocation or GPS coordinate, a second residential property, or another distribution center different from the first distribution center, a street address, street intersection (or street corner), a sidewalk on a street, a public venue (e.g., a sports stadium, concert hall), a school, a college or university (e.g., a dorm, a cafeteria, etc.), a hospital, or any other applicable location where an autonomous storage unit may operate.

Still another aspect of the present disclosure relates to a system configured for controlling an autonomous inventory management system. The system may include means for directing a first transport system to a first location. The first transport system may be configured to transport one or more autonomous storage units from the first location. Each of the one or more autonomous storage units may be configured to transport at least one inventory item. In some cases, the at least one inventory item may be a respective autonomous storage unit. The system may include means for determining a respective drop off location for each of the one or more autonomous storage units. The drop off location may be different from the first location. The system may include means for determining a boarding order for the one or more autonomous storage units based at least in part on the respective drop off location for each of the one or more autonomous storage units. The system may include means for directing the one or more autonomous storage units to board the first transport system at the first location. The directing may be based at least in part on the boarding order. The system may include means for transporting the one or more autonomous storage units from the first location to the one or more respective drop off locations. In some embodiments, the first location is one of a first distribution center, a first street address, a first geolocation or GPS coordinate, a first retail location, a first residential property, or a first maintenance center. Further, the drop off location may be one of a second retail location, another maintenance center different from the first maintenance center, a second residential property, a second street address, a second geolocation or GPS coordinate, or another distribution center different from the first distribution center. In some examples, each of the one or more autonomous storage units comprises a housing, an inventory storage device physically coupled to the housing, and configured to transport the at least one inventory item, a power device, wherein the power device is operationally configured to supply power to electrical components of the autonomous storage unit, a drive device in electrical communication with the power device, the drive device operationally configured to physically move the autonomous storage unit in one or more control territories, and one or more of: a navigation device operationally configured to transmit and receive geographic data and determine a physical location of the autonomous storage unit, a sensing device operationally configured to detect physical objects and transmit and receive physical object data, and a control device, wherein the control device is in electronic communication with the power device, the drive device, and one or more of the navigation device and the sensing device, and is operationally configured to control the autonomous storage unit.

Even another aspect of the present disclosure relates to a non-transient computer-readable storage medium having instructions embodied thereon, the instructions being executable by one or more processors to perform a method for controlling an autonomous inventory management system. The method may include directing a first transport system to a first location. The first transport system may be configured to transport one or more autonomous storage units from the first location. Each of the one or more autonomous storage units may be configured to transport at least one inventory item. In some examples, each of the one or more autonomous storage units comprises a housing, an inventory storage device physically coupled to the housing, and configured to transport the at least one inventory item, a power device, wherein the power device is operationally configured to supply power to electrical components of the autonomous storage unit, a drive device in electrical communication with the power device, the drive device operationally configured to physically move the autonomous storage unit in one or more control territories, and one or more of: a navigation device operationally configured to transmit and receive geographic data and determine a physical location of the autonomous storage unit, a sensing device operationally configured to detect physical objects and transmit and receive physical object data, and a control device, wherein the control device is in electronic communication with the power device, the drive device, and one or more of the navigation device and the sensing device, and is operationally configured to control the autonomous storage unit. In some cases, the at least one inventory item may be a respective autonomous storage unit. The method may include determining a respective drop off location for each of the one or more autonomous storage units. The drop off location may be different from the first location. The method may include determining a boarding order for the one or more autonomous storage units based at least in part on the respective drop off location for each of the one or more autonomous storage units. The method may include directing the one or more autonomous storage units to board the first transport system at the first location. The directing may be based at least in part on the boarding order. The method may include transporting the one or more autonomous storage units from the first location to the one or more respective drop off locations. In some embodiments, the first location is one of a first distribution center, a first street address, a first geolocation or GPS coordinate, a first retail location, a first residential property, or a first maintenance center. Further, the drop off location may be one of a second retail location, a second street address, a second geolocation or GPS coordinate, another maintenance center different from the first maintenance center, a second residential property, or another distribution center different from the first distribution center.

Some examples of the method, system, and non-transient computer readable medium described above may further include processes, features, means, or instructions for directing at least one autonomous storage unit to depart the first transport system at the respective drop off location.

In some examples of the method, system, and non-transient computer-readable storage medium described above the first location is one of a first distribution center, a first retail location, a first residential property, a first street address, a first Global Positioning System (GPS) coordinate, or a first maintenance center.

In some examples of the method, system, and non-transient computer-readable storage medium described above the drop off location is one of a second retail location, another maintenance center different from the first maintenance center, a second residential property, a second street address, a second GPS coordinate, or another distribution center different from the first distribution center.

In some examples of the method, system, and non-transient computer-readable storage medium described above the first transport system comprises a wireless control system configured to communicate with the one or more autonomous storage units and one or more central servers, and wherein the first transport system confirms an identity for each of the one or more autonomous storage units prior to receiving the one or more autonomous storage units.

In some examples of the method, system, and non-transient computer-readable storage medium described above the first location comprises a first central server, and wherein the first central server is a host central server.

In some examples of the method, system, and non-transient computer-readable storage medium described above each drop off location comprises at least one central server.

Some examples of the method, system, and non-transient computer readable medium described above may further include processes, features, means, or instructions for registering, for at least one autonomous storage unit, an autonomous storage unit boarding event with the host central server; and registering, for the at least one autonomous storage unit, an autonomous storage unit departure event with the at least one central server at the respective drop off location, wherein registering the autonomous storage unit departure event is based at least in part on determining a departure of the at least autonomous storage unit from the first transport system.

Some examples of the method, system, and non-transient computer readable medium described above may further include processes, features, means, or instructions for registering, for the at least one autonomous storage unit, the autonomous storage unit departure event with the host central server at the first location.

In some examples of the method, system, and non-transient computer-readable storage medium described above determining the boarding order for the one or more autonomous storage units is based at least in part on a drop off priority order for the one or more autonomous storage units.

In some examples of the method, system, and non-transient computer-readable storage medium described above the at least one inventory item comprises a respective autonomous storage unit. In other words, an autonomous storage unit is transporting itself (e.g., in an empty state or with no inventory items).

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
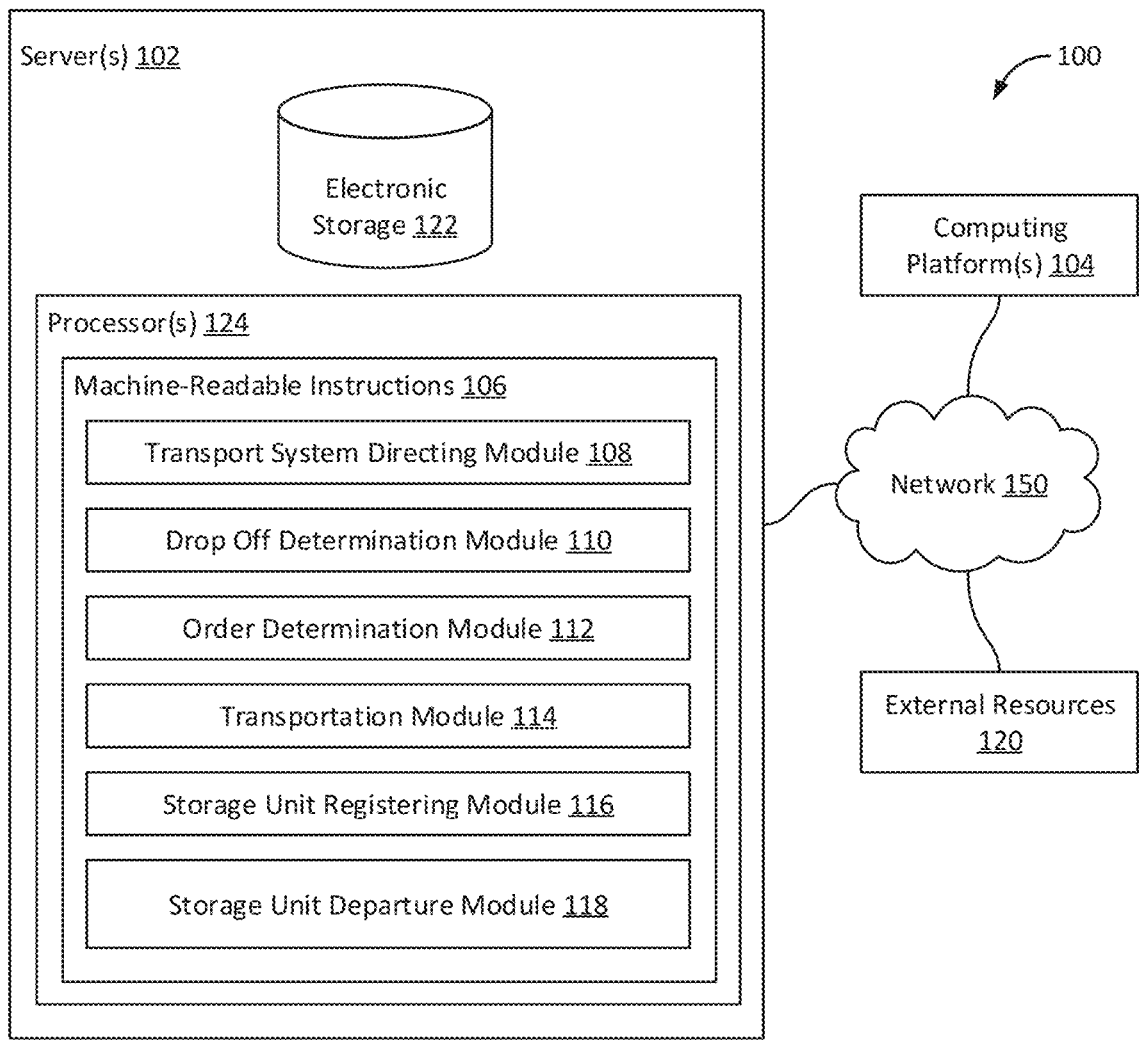
FIG. 1 illustrates a system configured for controlling an autonomous inventory management system, in accordance with one or more implementations.

The words "for example" is used herein to mean "serving as an example, instance, or illustration." Any embodiment described herein as "for example" is not necessarily to be construed as preferred or advantageous over other embodiments.

Current techniques in inventory handling and transport include complex and centrally managed transportation management systems. Such transportation management systems are configured to individually and methodically control multiple inventory storage units in parallel. Besides the complex nature of implementing such systems, these systems lack the ability to dynamically respond to urgent inventory demands, as well as environmental changes with minimal latency.

The Applicant's disclosure aims to alleviate some of these shortcomings of current inventory transportation management systems by supporting real-time communications between central servers and transport controllers, updates from autonomous inventory storage units and transport controllers, and dynamic decision-making capabilities at autonomous storage units and transport controllers. In some cases, the term "transport controller" may be used to refer to a central server or control system installed on or near a transportation system. In some other cases, the central server may be located at a distribution center (e.g., a warehouse), or may be located in the cloud. Further, the transportation system may be equipped with one or more of a transporter controller (e.g., a wireless control system) and a computing system (e.g., a mobile device, a laptop, a tablet, etc.) that is in communication with the central server. Alternatively, a user (e.g., a driver) of the transportation system may utilize an application installed on their user device (e.g., smartphone) to receive instructions from the central server. The application may be a mobile app, a web app, etc.

As used herein, the term "transportation system" may refer to a device or system capable of transporting inventory items or autonomous storage units from a first geographic point to a second geographic point. Some non-exhaustive examples of transportation systems may include automobiles (e.g., cars, trucks), trains, planes, helicopters, ships, boats, hovercrafts, conveyor belts, motorcycles, bicycles, mopeds, etc. In some circumstances, autonomous storage units may utilize wireless and/or Near Field Communication (NFC) technologies, such as Wi-Fi, Bluetooth, Bluetooth Low Energy (BLE), NFC, etc., to connect with transportation systems owned by various couriers and freight companies to plan their path from a source to a final destination. Additionally or alternatively, an autonomous storage unit or robot may also transmit periodic pings to update the transport controller on the status of its goods, its internal mechanical and computing systems, etc. In some examples, such periodic pings may also be referred to as "heart-beat" messages and may allow the autonomous storage unit to transmit real-time updates to the transport controller. In some examples, robots may also transmit heart-beat messages or pings to other controllers besides the transport controller, such as a central server. In some circumstances, a robot or autonomous storage unit may stop transmitting periodic pings or heart-beat messages, for instance, due to a malfunction at the robot. In other cases, the robot may not be able to respond to pings or messages received from the transport controller. In such cases, the transport controller may instruct the user or the transportation system to reroute to a maintenance center. Further, the transport controller may instruct one or more robots to disembark (e.g., temporarily) so that the malfunctioning robot could be attended to (e.g., repaired, replaced after unloading its inventory, etc.). In some cases, based on the complexity of the malfunction, an autonomous repair robot or a human operator may assist in fixing said robot.

In some cases, transportation systems, such as trucks, trains, planes, automobiles, etc., may be configured to transport autonomous storage units or robots between different locations or geographic regions in response to an inventory demand. In some examples, the transportation systems may also comprise self-driving or autonomous navigation capabilities. For instance, transportation systems may comprise navigation, communication, and sensing components, which may allow for autonomous or semi-autonomous travel (e.g., with minimal human input) between different geographic regions (e.g., across a city, between cities spread across a state, country, etc.). In some cases, transportation systems may travel via one or more waypoints (also referred to as way stations or cross docking facilities for purposes of this disclosure) prior to delivering an autonomous storage unit to its final-destination. Further, transportation systems may also be configured to accept, at the one or more waypoints, one or more other autonomous storage units for delivery to the final-destination or another destination. In some embodiments, transportation systems may also be referred to as auto shelf transporters or robot transporters. Robot transporters may be configured to connect, wirelessly, to a central system, such as a warehouse or retail central system. In some embodiments, robot transporters may be aware of the autonomous storage units they are transporting between different locations. Robot transporters may be configured to verify the identity of autonomous storage units prior to accepting and transporting them. In some cases, verifying the identity for an autonomous storage unit may include one or more of: confirming the storage unit's identification number, drop off location, currently held inventory, customer identity linked to at least one inventory item being delivered, etc. In some cases, the robot transporters may be human operated (i.e., with no autonomous or semi-autonomous navigation capabilities).

In some embodiments, after a robot transporter or truck arrives at a dispatch location (e.g., at a warehouse), it may connect (i.e., wired or wirelessly) to a controller or central system at the warehouse. In some cases, the robot transporter may also confirm the identity of one or more autonomous storage units waiting to board the truck. In some aspects, like a passenger boarding a plane, an autonomous storage unit may present its identity and credentials to the truck's transport controller, following which it may board the truck and position itself in its designated spot. In some cases, the spot may be designated by the transport controller, warehouse central system, or a combination.

In some cases, the transport controller and warehouse controller may negotiate one or more of a boarding order, storage unit placement, etc., on the transporter prior to the boarding. For instance, the robot transporter may assign autonomous storage units a boarding number (e.g., boarding position 1, 2, 5, etc.) based on their unloading or disembarking order. In some embodiments, autonomous storage units disembarking earlier in the journey may be boarded last. In some embodiments, autonomous storage units may be placed or positioned on the robot transporter based on their loading/boarding order, size of the autonomous storage unit, power or battery charge level, additional considerations (e.g., temperature, humidity ranges for inventory items held by the storage unit), etc.

In some cases, the placement location for autonomous storage units on a robot transporter may be based in part on the inventory items they are carrying (e.g., if inventory item(s) are sensitive to vibrations, temperature, light, etc.). As an example, a robot transporter or truck may comprise a refrigerated section and a non-refrigerated section. In such cases, the robot transporter or truck may assign an autonomous storage unit carrying inventory item(s) requiring cooling a spot in its refrigerated section. As further described in U.S. Non-Provisional application Ser. Nos. 16/708,618; 16/867,707; and 16/867,711, incorporated herein by reference, autonomous storage units may comprise one or more cooling units or shelves for carrying inventory items, such as medicines, perishable foods, vaccines, blood, beverages, etc. In such cases, placing autonomous storage units in the refrigerated section of the transporter may allow their cooling units to be turned off during transport (e.g., to conserve power). In other cases, the refrigerated section of the transporter may act as a source of backup cooling, which may serve to mitigate loss in case a cooling unit of an autonomous robot suffers from mechanical and/or electrical issues during transport.

Currently, determining loading order and/or placement of inventory storage units requires substantial human input and is often performed manually. However, according to the present disclosure, transportation systems and controllers may optimize the amount of time taken to load and place multiple autonomous storage units on the transportation system by not only negotiating a loading/boarding order of the autonomous storage units, but also assigning them designated spots on the transportation system.

In existing techniques, a human operator may spend a significant amount of time determining an optimum placement for multiple storage units on a truck due to the large number of possible arrangements. Besides being time consuming, determining an optimum placement and loading order may far exceed human mental capacity in some cases. Consequently, physical space on current transporters and transportation systems is either underutilized or not utilized effectively (e.g., loading and unloading inventory is cumbersome due to inefficient placement on the transporter). In this way, aspects of the present disclosure may serve to alleviate the inefficiencies described above by effective utilization of physical space, which may be achieved by prior negotiation between the transportation system and controller.

In some cases, after negotiations between the transportation system and the central system or controller, one or more autonomous storage units may receive a loading/boarding order or a boarding number for boarding the transporter. In some circumstances, autonomous storage units may also be assigned a designated spot on the transporter. In such cases, the autonomous storage units may reorder themselves in a waiting area near the dock (or dispatch location) based on their individual boarding numbers and designated spots. In some aspects, a systematic boarding order, such as the one described above, may not only optimize the use of physical space at the loading dock and/or the transporter, but also accelerate the loading and unloading process.

In some cases, autonomous storage units may comprise computing power, allowing them to perform functions besides just physically holding the inventory. For instance, the autonomous inventory robot may be aware of the inventory items it is carrying, as well as a drop off location for each of those inventory items. In some other cases, the autonomous inventory robot may be configured to make rerouting or planning decisions based on one or more relevant business rules, such as finding the fastest path or cheapest path to its destination. Furthermore, autonomous storage units may be configured to receive instructions from one or more of a transportation system and a controller, such as a warehouse or retail controller. Alternatively, a human operator (e.g., driver of a transportation system, warehouse employee, etc.) may provide instructions to one or more autonomous storage units using a mobile device, such as a smartphone. For instance, the human operator may communicate with one or more autonomous storage units using an app installed on the mobile device.

Figure 6:
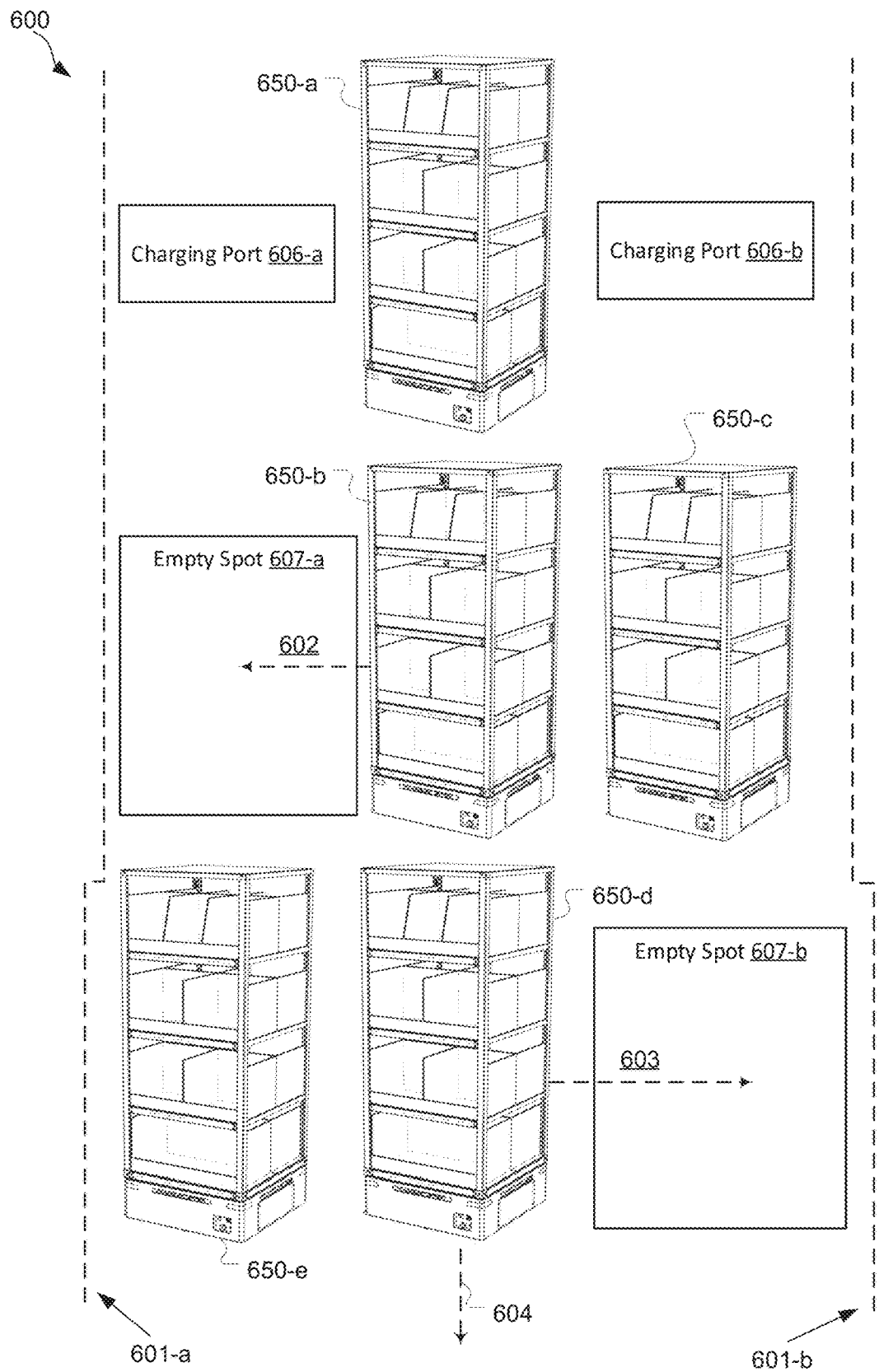
FIG. 6 illustrates an example of a mobile inventory transport communication network in relation to a transportation system setting, in accordance with one or more implementations.

As further described in relation to FIG. 6, in some embodiments, a transportation system may receive an update or alert from a controller, such as a warehouse controller, to deliver an autonomous storage unit to a destination other than the one previously negotiated, for instance, based on an urgent inventory demand at the new destination. In some cases, the warehouse controller may also identify the autonomous storage unit, for instance, via a storage unit identification number. In such cases, the transportation system may be configured to update its original destination and reroute to the new destination. Furthermore, the transportation system may also transmit an indication to the identified autonomous storage unit to alert it that its destination has been updated, and to rearrange itself, if feasible, on the transportation system during transit.

In some embodiments, the autonomous storage unit may attempt to rearrange itself closer to an exit door of the transporter, which may facilitate expediting the unloading process at the new destination. For instance, the autonomous storage unit may negotiate with other autonomous storage units in its vicinity to relocate (e.g., to the left or to the right) to create a path for the autonomous storage unit, thus allowing the autonomous storage unit to relocate to an area closer to the transporter's exit door, further described in relation to FIG. 6. In other cases, autonomous storage units may be configured to transfer inventory items between each other. In one example, the autonomous storage unit may transfer the inventory item to be dropped off at the new destination to another storage unit closer to the exit. It should be noted that, in some cases, autonomous storage units may relocate and/or transfer inventory items while in transit on the transportation system. In some circumstances, reordering or rearranging robots on the transporter may be akin to the sliding puzzle or sliding tile game, wherein one or more empty spots or areas (e.g., 2 free spaces) may be needed for the robots to reorder themselves while on the transporter.

In some embodiments, the final destination control territory for an autonomous storage unit may not be negotiated in advance between the host central server and the transport controller, which may allow the destination control territory to be modified even after the storage unit has boarded the transportation system. In some aspects, such a system may support a higher level of flexibility in situations when the final destination control territory is unknown, or circumstances may warrant the final destination to be changed. In such cases, the transportation system or truck may be viewed as the last control territory for the robot (not just the inventory carrier). Further, the transportation system or truck may be configured to update the final destination control territory for the autonomous storage unit based on further information (e.g., a request for inventory at a destination territory) received by the transportation system. In some embodiments, the transportation system may trigger a transfer of robot control to a central server or controller at the new destination territory before proceeding to drop off the robot. Thus, in some cases, the truck or transportation system, rather than a central server, may serve as the trigger for updating the final destination control territory for a robot or autonomous storage unit.

FIG. 1 illustrates a system 100 configured for controlling an autonomous inventory management system, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction modules. The instruction modules may include computer program modules. The instruction modules may include one or more of transport system directing module 108, dropoff determination module 110, order determination module 112, transportation module 114, storage unit registering module 116, storage unit departure module 118, and/or other instruction modules.

In some implementations, server(s) 102, client computing platform(s) 104, and/or external resources 120 may be operatively linked via one or more electronic communication links. For example, such electronic communication links may be established, at least in part, via a network 150 such as the Internet and/or other networks. It will be appreciated that this is not intended to be limiting, and that the scope of this disclosure includes implementations in which server(s) 102, client computing platform(s) 104, and/or external resources 120 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 120, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 120 may include sources of information outside of system 100, external entities participating with system 100, and/or other resources. In some implementations, some or all of the functionality attributed herein to external resources 120 may be provided by resources included in system 100.

Transport system directing module 108 may be configured to direct a first transport system to a first location. The first location may be a first distribution center (or warehouse), a maintenance center, a street address, a public venue, or any other applicable location in which the transport system and/or the autonomous storage units may operate. By way of non-limiting example, the first location or a respective drop off location may be one of a retail location, or another distribution center different from the first distribution center. The first location may include a first central server. Although not necessary, in some embodiments, each drop off location may include at least one central server.

The first transport system may be configured to transport one or more autonomous storage units from the first location. The first transport system may include a wireless control system (e.g., Wi-Fi, NFC, Bluetooth, etc.) configured to communicate with the one or more autonomous storage units and one or more central servers. The first central server may be a host central server. Each of the one or more autonomous storage units may be configured to transport at least one inventory item. In some other cases, the autonomous storage unit or the robot may itself be the at least one inventory item. In other words, while robots or autonomous storage units may usually serve to hold inventory, in some cases, robots or autonomous storage units may themselves be the inventory. It should be noted that, in some embodiments, autonomous units or robots may comprise a humanoid shape or form and may comprise legs instead of wheels. For instance, humanoid robots or autonomous units may be employed as personal assistants or butlers and may have minimal storage space for holding inventory items. In such cases, the transport system may be configured to transport these autonomous units or robots carrying minimal or no inventory between different locations (e.g., from the first location to the second location). In some examples, the first transport system may confirm an identity (e.g., a unique identifier associated with the robot) for each of the one or more autonomous storage units prior to directing the one or more autonomous storage units to board the first transport system.

Transport system directing module 108 may be configured to direct the one or more autonomous storage units to board the first transport system at the first location. The directing may be based at least in part on the boarding order.

Transport system directing module 108 may be configured to direct at least one autonomous storage unit to depart the first transport system at a respective drop off location. As noted above, the drop off location may be pre-defined based on a negotiation between the transport controller and a central server. In some other cases, the central server may transmit an indication of the drop off location after the transport system has departed the first location (e.g., warehouse).

Dropoff determination module 110 may be configured to determine a drop off location for each of the one or more autonomous storage units. In some examples, the drop off location may be different from the first location.

Order determination module 112 may be configured to determine a boarding order for the one or more autonomous storage units based at least in part on the drop off location for each of the one or more autonomous storage units. Determining the boarding order for the one or more autonomous storage units may be based at least in part on a drop off priority order for the one or more autonomous storage units. For instance, autonomous storage units that are being dropped off later in the journey may be boarded first, which may ease unloading of autonomous storage units that are being dropped off first (i.e., since they are closer to the exit door).

Transportation module 114 may be configured to transport the one or more autonomous storage units from the first location to one or more respective drop off locations.

Storage unit registering module 116 may be configured to register, for at least one autonomous storage unit, an autonomous storage unit boarding event with the host central server. In this way, the host central server may track the location of multiple autonomous storage units in real time and/or provide instructions to update a drop off location for an autonomous storage unit, to name two non-limiting examples.

Storage unit departure module 118 may be configured to register, for the at least one autonomous storage unit, an autonomous storage unit departure event with the at least one central server at a respective drop off location. Registering the autonomous storage unit departure event may be based at least in part on determining a departure of the at least autonomous storage unit from the first transport system. In some cases, an autonomous storage unit may transmit an indication to the storage unit departure module when it disembarks the transportation system. Other techniques for determining the departure of an autonomous storage unit are contemplated in different embodiments. For instance, the transportation system may comprise one or more sensors (e.g., weight sensors, optical sensors, etc.), RFID scanners, QR code scanners, etc., to determine when a departure event occurs, an identity of the departing robot, inventory (if any) held by the departing robot, etc. Additionally or alternatively, one or more autonomous storage units remaining on the transportation system may transmit an indication of an autonomous storage unit departure event to the storage unit departure module. For instance, an autonomous storage unit may identify when an adjacent autonomous storage unit departs the transportation system and may report the same to the storage unit departure module 118.

Storage unit departure module 118 may be configured to register, for the at least one autonomous storage unit, the autonomous storage unit departure event with the host central server at the first location. In some embodiments, a change in ownership of the robot, its inventory or possessions, or a combination may be triggered in response to registering an autonomous storage unit boarding event, an autonomous storage unit departure event, or another known event.

Server(s) 102 may include electronic storage 122, one or more processors 124, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may comprise non-transitory storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. Processor(s) 124 may be configured to execute modules 108, 110, 112, 114, 116, and/or 118, and/or other modules. Processor(s) 124 may be configured to execute modules 108, 110, 112, 114, 116, and/or 118, and/or other modules by software; hardware; firmware; some combination of software, hardware, and/or firmware; and/or other mechanisms for configuring processing capabilities on processor(s) 124. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 116, and/or 118 are illustrated in FIG. 1 as being implemented within a single processing unit, in implementations in which processor(s) 124 includes multiple processing units, one or more of modules 108, 110, 112, 114, 116, and/or 118 may be implemented remotely from the other modules. The description of the functionality provided by the different modules 108, 110, 112, 114, 116, and/or 118 described below is for illustrative purposes, and is not intended to be limiting, as any of modules 108, 110, 112, 114, 116, and/or 118 may provide more or less functionality than is described. For example, one or more of modules 108, 110, 112, 114, 116, and/or 118 may be eliminated, and some or all of its functionality may be provided by other ones of modules 108, 110, 112, 114, 116, and/or 118. As another example, processor(s) 124 may be configured to execute one or more additional modules that may perform some or all of the functionality attributed below to one of modules 108, 110, 112, 114, 116, and/or 118.

Figure 2A:
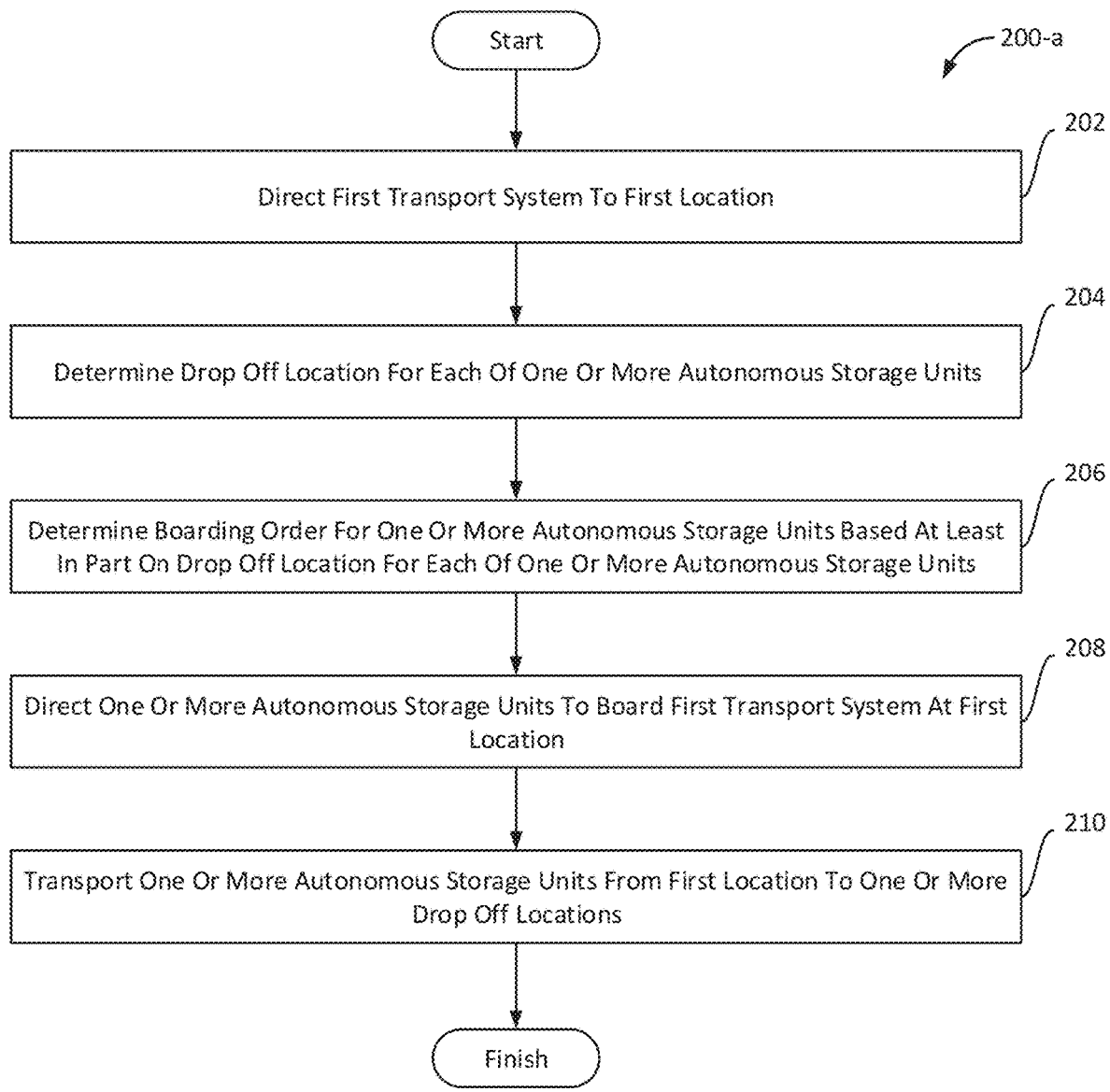
FIGS. 2A, 2B, 2C, and/or 2D illustrate a method for controlling an autonomous inventory management system, in accordance with one or more implementations.
Figure 2B:
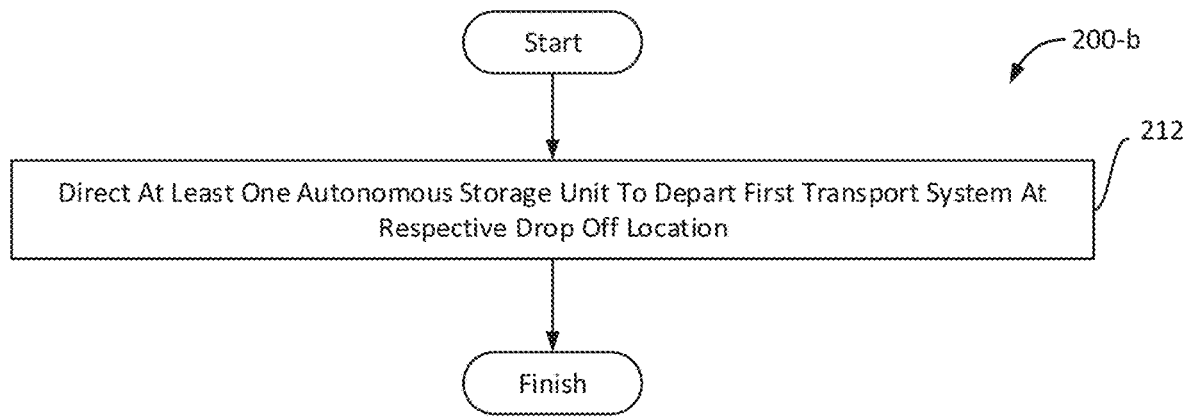
Figure 2C:
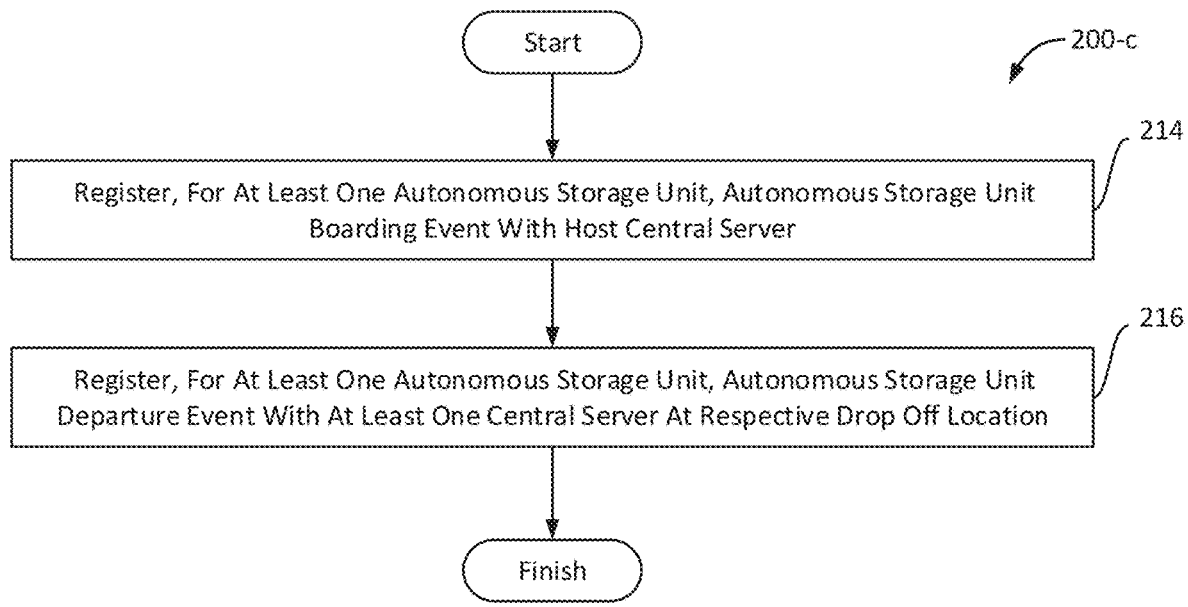

FIGS. 2A, 2B, 2C, and/or 2D illustrate a method 200 for controlling an autonomous inventory management system, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIGS. 2A, 2B, 2C, and/or 2D and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

FIG. 2A illustrates method 200-*a*, in accordance with one or more implementations.

A first operation 202 may include directing a first transport system to a first location. The first transport system may be configured to transport one or more autonomous storage units from the first location. Each of the one or more autonomous storage units may be configured to transport at least one inventory item. In some other cases, the autonomous storage unit or the robot may itself be the at least one inventory item. In other words, while robots or autonomous storage units may usually serve to hold inventory, in some cases, robots or autonomous storage units may themselves be the inventory. First operation 202 may be performed by one or more hardware processors configured by machine-readable instructions including a module that is the same as or similar to transport system directing module 108, in accordance with one or more implementations.

A second operation 204 may include determining a respective drop off location for each of the one or more autonomous storage units. The drop off location may be different from the first location. Second operation 204 may be performed by one or more hardware processors configured by machine-readable instructions including a module that is the same as or similar to drop off determination module 110, in accordance with one or more implementations.

A third operation 206 may include determining a boarding order for the one or more autonomous storage units based at least in part on the respective drop off location for each of the one or more autonomous storage units. Third operation 206 may be performed by one or more hardware processors configured by machine-readable instructions including a module that is the same as or similar to order determination module 112, in accordance with one or more implementations.

A fourth operation 208 may include directing the one or more autonomous storage units to board the first transport system at the first location. The directing may be based at least in part on the boarding order. Fourth operation 208 may be performed by one or more hardware processors configured by machine-readable instructions including a module that is the same as or similar to transport system directing module 108, in accordance with one or more implementations.

A fifth operation 210 may include transporting the one or more autonomous storage units from the first location to the one or more respective drop off locations. Fifth operation 210 may be performed by one or more hardware processors configured by machine-readable instructions including a module that is the same as or similar to transportation module 114, in accordance with one or more implementations.

FIG. 2B illustrates method 200-b, in accordance with one or more implementations.

A first operation 212 may include directing at least one autonomous storage unit to depart the first transport system at the respective drop off location. First operation 212 may be performed by one or more hardware processors configured by machine-readable instructions including a module that is the same as or similar to transport system directing module 108, in accordance with one or more implementations.

FIG. 2C illustrates method 200-c, in accordance with one or more implementations.

A first operation 214 may include registering, for at least one autonomous storage unit, an autonomous storage unit boarding event with the host central server. Although not necessary, in some examples, the host central server may be located at a first location (e.g., distribution center, warehouse, maintenance center, etc.). In some other cases, the host central server may be located in the cloud, or any other applicable location. First operation 214 may be performed by one or more hardware processors configured by machine-readable instructions including a module that is the same as or similar to storage unit registering module 116, in accordance with one or more implementations.

A second operation 216 may include registering, for the at least one autonomous storage unit, an autonomous storage unit departure event with the at least one central server at the respective drop off location. Registering the autonomous storage unit departure event may be based at least in part on determining a departure of the at least autonomous storage unit from the first transport system. Second operation 216 may be performed by one or more hardware processors configured by machine-readable instructions including a module that is the same as or similar to storage unit departure module 118, in accordance with one or more implementations.

As described above, in some embodiments, a change in ownership of the robot, its inventory or possessions, or a combination may be triggered in response to registering an autonomous storage unit boarding event, an autonomous storage unit departure event, or another known event.

Figure 2D:
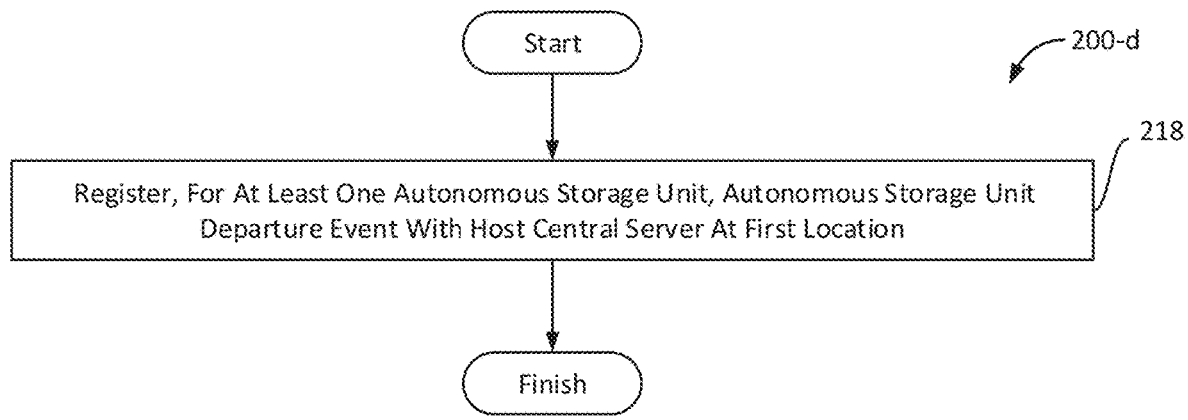

FIG. 2D illustrates method 200-d, in accordance with one or more implementations.

A first operation 218 may include registering, for the at least one autonomous storage unit, the autonomous storage unit departure event with the host central server. In some examples, the host central server may be located at the first location. First operation 218 may be performed by one or more hardware processors configured by machine-readable instructions including a module that is the same as or similar to storage unit departure module 118, in accordance with one or more implementations. In some embodiments, upon registering an autonomous storage unit boarding event, an autonomous storage unit departure event, or another known event, a change in ownership of the robot, its inventory or possessions, or a combination may be triggered in response to registering said event.

Figure 3:
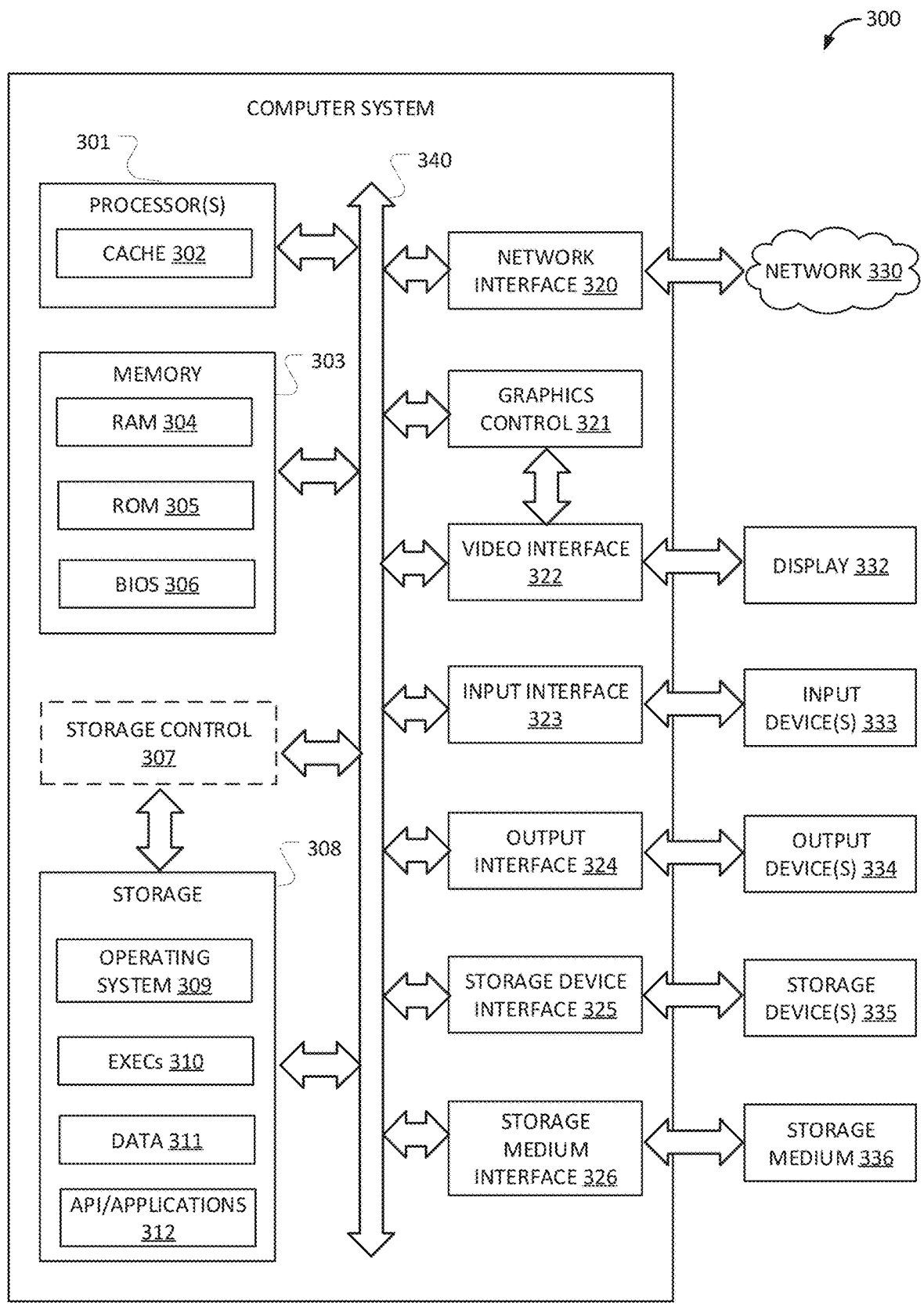
FIG. 3 is a block diagram depicting an exemplary machine that includes a computer system within which a set of instructions can be executed for causing a device to perform or execute any one or more of the aspects and/or methodologies of the present disclosure.

Referring to FIG. 3, it is a block diagram depicting an exemplary machine that includes a computer system 300 within which a set of instructions can execute for causing a device to perform or execute any one or more of the aspects and/or methodologies of the present disclosure. The components in FIG. 3 are examples only and do not limit the scope of use or functionality of any hardware, software, embedded logic component, or a combination of two or more such components implementing particular embodiments.

Computer system 300 may include a processor 301, a memory 303, and a storage 308 that communicate with each other, and with other components, via a bus 340. The bus 340 may also link a display 332, one or more input devices 333 (which may, for example, include a keypad, a keyboard, a mouse, a stylus, etc.), one or more output devices 334, one or more storage devices 335, and various tangible storage media 336. All of these elements may interface directly or via one or more interfaces or adaptors to the bus 340. For instance, the various tangible storage media 336 can interface with the bus 340 via storage medium interface 326. Computer system 300 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 301 (or central processing unit(s) (CPU(s))) optionally contains a cache memory unit 302 for temporary local storage of instructions, data, or computer addresses. Processor(s) 301 are configured to assist in execution of computer readable instructions. Computer system 300 may provide functionality for the components depicted in any of FIGS. 1-6 as a result of the processor(s) 301 executing non-transitory, processor-executable instructions embodied in one or more tangible computer-readable storage media, such as memory 303, storage 308, storage devices 335, and/or storage medium 336. The computer-readable media may store software that implements particular embodiments, and processor(s) 301 may execute the software. Memory 303 may read the software from one or more other computer-readable media (such as mass storage device(s) 335, 336) or from one or more other sources through a suitable interface, such as network interface 320. The software may cause processor(s) 301 to carry out one or more processes or one or more steps of one or more processes described or illustrated herein. Carrying out such processes or steps may include defining data structures stored in memory 303 and modifying the data structures as directed by the software.

The memory 303 may include various components (e.g., machine readable media) including, but not limited to, a random-access memory component (e.g., RAM 304) (e.g., a static RAM "SRAM", a dynamic RAM "DRAM, etc.), a read-only component (e.g., ROM 305), and any combinations thereof. ROM 305 may act to communicate data and instructions unidirectionally to processor(s) 301, and RAM 304 may act to communicate data and instructions bidirectionally with processor(s) 301. ROM 305 and RAM 304 may include any suitable tangible computer-readable media described below. In one example, a basic input/output system 306 (BIOS), including basic routines that help to transfer information between elements within computer system 300, such as during start-up, may be stored in the memory 303.

Fixed storage 308 is connected bidirectionally to processor(s) 301, optionally through storage control unit 307. Fixed storage 308 provides additional data storage capacity and may also include any suitable tangible computer-readable media described herein. Storage 308 may be used to store operating system 309, EXECS 310 (executables), data 311, API applications 312 (application programs), and the like. Often, although not always, storage 308 is a secondary storage medium (such as a hard disk) that is slower than primary storage (e.g., memory 303). Storage 308 can also include an optical disk drive, a solid-state memory device (e.g., flash-based systems), or a combination of any of the above. Information in storage 308 may, in appropriate cases, be incorporated as virtual memory in memory 303.

In one example, storage device(s) 335 may be removably interfaced with computer system 300 (e.g., via an external port connector (not shown)) via a storage device interface 325. Particularly, storage device(s) 335 and an associated machine-readable medium may provide nonvolatile and/or volatile storage of machine-readable instructions, data structures, program modules, and/or other data for the computer system 300. In one example, software may reside, completely or partially, within a machine-readable medium on storage device(s) 335. In another example, software may reside, completely or partially, within processor(s) 301.

Bus 340 connects a wide variety of subsystems. Herein, reference to a bus may encompass one or more digital signal lines serving a common function, where appropriate. Bus 340 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 300 may also include an input device 333. In one example, a user of computer system 300 may enter commands and/or other information into computer system 300 via input device(s) 333. Examples of an input device(s) 333 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 333 may be interfaced to bus 340 via any of a variety of input interfaces 323 (e.g., input interface 323) including, but not limited to, serial, parallel, game port, USB, FIREWIRE, THUNDERBOLT, or any combination of the above.

In particular embodiments, when computer system 300 is connected to network 330, computer system 300 may communicate with other devices, specifically mobile devices and enterprise systems, connected to network 330. Communications to and from computer system 300 may be sent through network interface 320. For example, network interface 320 may receive incoming communications (such as requests or responses from other devices) in the form of one or more packets (such as Internet Protocol (IP) packets) from network 330, and computer system 300 may store the incoming communications in memory 303 for processing. Computer system 300 may similarly store outgoing communications (such as requests or responses to other devices) in the form of one or more packets in memory 303 and communicated to network 330 from network interface 320. Processor(s) 301 may access these communication packets stored in memory 303 for processing.

Examples of the network interface 320 include, but are not limited to, a network interface card, a modem, and any combination thereof. Examples of a network 330 or network segment 330 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 330, may employ a wired and/or a wireless mode of communication. In general, any network topology may be used.

Information and data can be displayed through a display 332. Examples of a display 332 include, but are not limited to, a liquid crystal display (LCD), an organic liquid crystal display (OLED), a cathode ray tube (CRT), a plasma display, and any combinations thereof. The display 332 can interface to the processor(s) 301, memory 303, and fixed storage 308, as well as other devices, such as input device(s) 333, via the bus 340. The display 332 is linked to the bus 340 via a video interface 322, and transport of data between the display 332 and the bus 340 can be controlled via the graphics control 321.

In addition to a display 332, computer system 300 may include one or more other peripheral output devices 334 including, but not limited to, an audio speaker, a printer, and any combinations thereof. Such peripheral output devices may be connected to the bus 340 via an output interface 324. Examples of an output interface 324 include, but are not limited to, a serial port, a parallel connection, a USB port, a FIREWIRE port, a THUNDERBOLT port, and any combinations thereof.

In addition, or as an alternative, computer system 300 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Figure 4:
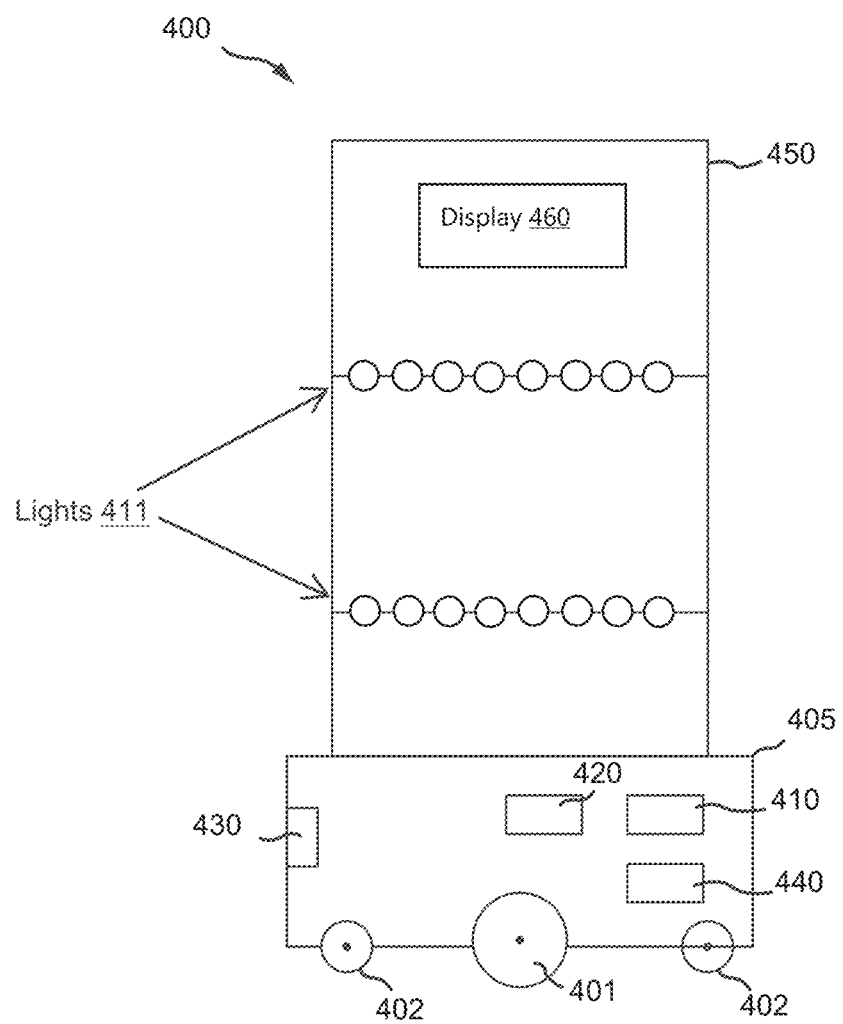
FIG. 4 illustrates an example of a mobile inventory transport unit (MITU), in accordance with one or more implementations.

FIG. 4 illustrates an example of an autonomous robot, also referred to as Mobile Inventory Transport Unit (MITU) 400, according to an embodiment of the disclosure. In some cases, MITU 400 may also be referred to as a smart rack robot, an autonomous smart rack robot, or an autonomous inventory storage unit. In some cases, MITU 400 may comprise a robot portion, where the robot portion may include one or more of drive device 401, balance device 402, control device 410, navigation device 420, sensing device 430, and power device 440. Further, the MITU 400 may comprise a structural portion including at least housing 405 and inventory storage device 450. In some examples, the robot portion of the MITU 400 may be shaped like a cube, a cuboid, a cylinder, or any other shape, and may comprise one or more wheels and balance devices on its lower portion. In some other cases, the robot portion may be surrounded by, or substantially surrounded by the housing 405. Further, the robot portion may be in electronic communication (either wired or wireless) with the housing 405 and/or the inventory storage device 450.

In some examples, housing 405 encloses the electrical and physical components contained within MITU 400. Housing 405 is physically coupled to an inventory storage device and serves as the base for the inventory storage device. Importantly, the physical coupling conjoins the inventory storage device and the housing 405 such that the two devices function as one physical object. In some cases, the housing 405 and the inventory storage device may be joined via screws, nuts and bolts, nails, any other type of fastener. Alternatively, the housing 405 and the inventory storage device 450 may be welded together or formed as a single unitary construction.

Inventory Storage

MITU 400 includes inventory storage device 450. Inventory storage device 450 stores physical items, such as inventory, that MITU 400 moves from at least a first physical location to a second physical location, or even multiple locations. Inventory storage device 450 may be a variety of storage devices including shelves, buckets, augers, and arms. Additionally or alternatively, the inventory storage device 450 may also comprise climate controlled units for handling and transporting items (e.g., pharmaceuticals, vaccines, blood for blood banks or blood donation drives, perishable goods, beverages, etc.) that need to be kept at a certain goal temperature. As shown, inventory storage device may be physically coupled to housing 405. In other words, the physical coupling of housing 405 and inventory storage device 450 creates one physical object. As shown, in some examples, the housing 405 and inventory storage device 450 may be in the form of a cube or a cuboid, and may be joined together via welding, or using one or more fasteners. In some other cases, a rod or pole (not shown) may pass through the center of the housing 405, where the rod is affixed to the upper portion of the housing 405. Further, the inventory storage device 450 may be installed on or around the rod, such that the rod passes through one or more shelves of the inventory storage device (i.e., shelves are perpendicular to the rod).

As indicated above, the inventory storage device 450 coupled with the robot portion of the MITU 400 may collectively be referred to as a smart rack robot. In some instances, upon loading, the inventory storage device may be operationally configured to determine information pertaining to the inventory it is holding. For instance, the smart rack robot may determine one or more of a name, a description, a quantity, a bar code or stock keeping unit (SKU), a price, a weight, a dimension, and a location within the inventory storage device for one or more items held by the storage device.

In some embodiments, the inventory storage device 450 may receive power from power device 440 of the robot portion of the MITU 400, for instance, to power lights or a display mounted on the inventory storage device. Additionally, or alternatively, the inventory storage device 450 may also comprise a power source (not shown), which may be used as a backup for power device 440. In some cases, the power may be transferred via cabling running through the center of the robot portion and the housing 405. For instance, one or more power cables may be installed around or inside the center rod (or pole) of the MITU 400. In one example, the robot portion of the MITU 400 may be configured to rotate inside the housing 405, for instance, when MITU 400 is turning at a corner. In such cases, a slip ring may be used to supply power and data to from the power device 440 to the inventory storage device 450. Slip rings may be examples of electromechanical devices that allow the transmission of power and electrical signals from a rotating object (e.g., robot portion) to a stationary structure (e.g., inventory storage device).

In some other cases, the power may be transferred wirelessly (e.g., resonant inductive coupling) or via an NFC connection. For instance, the housing 405 and the inventory storage device 450 may comprise NFC antennas that are coupled and spaced a distance (e.g., 1 mm, 2 mm, 1 cm, 2 cm, etc.) apart, allowing bidirectional transfer of power and data. The NFC antennas may be microstrip patch antennas (e.g., square, rectangle, circular, elliptical, or any other continuous shape) fabricated on the surface of a printed circuit board (PCB). Further, the substrate of the PCB may be composed of a dielectric material, such as Gallium Nitride (GaN), Gallium Arsenide (GaAs), epoxy resin, Teflon, ceramic, etc. In some cases, the MITU 400 may receive wireless power during transit on a transport system. For example, a resonant inductive loop/coil on the MITU 400 may inductively couple with another resonant inductive loop/coil on the transport system, which may enable the MITU 400 to remain charged during transit. Alternatively, the MITU 400 may be configured to dock with a charging station (e.g., power outlet) on the transport system. It should be noted that the MITU 400 may comprise both wired and wireless charging capabilities in some embodiments.

In some embodiments, the inventory storage device 450 may comprise one or more visual indicators, such as one or more rows of lights 411 (e.g., Light Emitting Diode (LED) lights). Further, the robot portion or the inventory storage device 450 may be configured to illuminate one or more lights or an entire row of lights, for instance, while a user is loading or unloading the shelves of the inventory storage device. In some cases, such lighting may be used to indicate which shelf or section of the inventory storage device a user is meant to pick an item from, which may not only serve to accelerate the loading and unloading process, but also improve user accuracy.

In some examples, the visual indicator may comprise a display 460, where the display 460 may be mounted on the inventory storage device 450. The display 460 may be an example of a Liquid Crystal Display (LCD), a LED display, or another High Definition (HD) display. In some cases, MITU 400 may deployed in a retail setting, and the display 460 may be used to display a price, or other key product information such as product specification, nutrition information and/or ingredients (if applicable), or even a product image. In some examples, the inventory storage device 450 may comprise one or more buttons adjacent (e.g., above or below) a slot or shelf on which a product is placed, and a user may view product information on the attached display by clicking the said buttons. In some embodiments, the inventory storage device may also comprise one or more cameras, Radio Frequency Identification (RFID) readers, or weigh scales for tracking inventory. In one example, a camera mounted on the inventory storage device 450 may capture images or video feeds, based on which the MITU may determine information pertaining to an item (e.g., description, quantity, etc.) that was taken off a shelf. In other cases, a RFID reader may scan RFID tags attached to items or products remaining on the shelf in order to determine the items (e.g., description, quantity, etc.) that were taken off the shelf. In yet other cases, a built-in weighing scale may be used to correlate the weight of the removed items to the weights and locations of different items initially stored in the inventory storage device 450. It should be noted that the inventory storage device may incorporate one or more of the inventory tracking techniques described above.

Upon detecting the removal of one or more items from its shelves, the inventory storage device 450 may update its inventory level and relay that information to a retail store based system or to the manufacturer (e.g., if the retailer utilizes pull-based replenishment methods). In other cases, the inventory storage device may alert or advise the retail store, for instance, if a customer incorrectly placed an item on its shelves. In yet other cases, the inventory storage device may issue alerts when it determines that it is being loaded or unloaded at a time outside a scheduled or authorized time period. In some cases, the inventory storage device may flash blinking lights or sound an audible alarm in response to such events.

Drive

In some embodiments, the MITU is configured to account for various anomalies in the environment, such as raised surfaces or other varying terrain. MITU 400 includes drive device 401. Drive device 401 supplies the method of moving MITU 400. Drive device 401 may be a variety of locomotion devices including one or more wheels, treads, or actuators. In some cases, drive device 401 may comprise four wheels, one on each edge or side of MITU 400. In some cases, one or more wheels may be raised up while the MITU 400 is traveling in a straight line. In some other cases, all four wheels may be in contact with the ground, for instance, to turn the MITU 400. In some embodiments, drive device 401 and control device 410 may control the pace at which the wheels rotate (i.e., same or different pace), allowing the MITU 400 to turn or take corners. In some examples, the MITU 400 may receive terrain information while navigating through a particular area from one or more other MITUs that have previously navigated through the same area, or alternatively, from a control system of a mobile inventory transport communication network. In other cases, the MITU 400 may identify variations in terrain in real-time, for example, via one or more sensors. The sensors may be selected from a group consisting of an accelerometer, a gyroscope, or any other sensors configured to register rapid variations in movement or spring displacement, which may indicate the presence of rough terrain. In other cases, the MITU 400 may support an "off-road" mode, which may include one or more of changing its suspension profile, spring dampening effects, and ground clearance.

In some examples, MITU 400 may be bipedal (2 legs), quadrupedal (4 legs), or hexapedal (6 legs). In some other examples, MITU 400 may comprise a combination of wheels and legs and may be referred to as a hybrid transport unit. In yet other examples, drive device 401 may enable MITU 400 to navigate by slithering (i.e., in a snake like motion). In some aspects, drive device 401 is the primary method for physically moving MITU 400 from a start point to an end point.

Balance

In some cases, MITU 400 may include balance device 402. In some cases, balance device 402 may supply weight distribution of MITU 400 and may offset the force exerted by drive device 401 when MITU 400 is either stationary or moving. In some examples, balance device 402 may incorporate a variety of balance devices including one or more wheels, one or more bearings, or a fixed apparatus. For instance, balance device 402 may be composed of two wheels, one in the front and one in the rear of the MITU 400. In some other cases, balance device 402 may comprise one or more sensors, such as a gyroscope, an accelerometer, or a combination. A gyroscope may be an example of a device used for measuring or maintaining orientation and/or angular velocity, and the orientation of the MITU 400 may be adjusted based in part on the output readings from the gyroscope. In some examples, a gyroscope or an accelerometer may be used in combination with a controller (e.g., a proportional-integral-derivative (PID) controller) to balance the MITU 400. In one example, MITU 400 or a control device 410 of MITU 400 may gather readings from one or more sensors (e.g., accelerometer or gyroscope) installed within the MITU. Further, MITU 400 may calculate an altitude (i.e., angle with respect to the horizon, or a surface the MITU is traveling over), compare the angle with a target angle (e.g., 0 degrees if it's a flat surface, 15 degrees, 30 degrees, etc., if it's an incline), and calculate a difference between the two angles. Based on the difference between the angles, the drive device 401 may cause the MITU 400 to accelerate (or decelerate) until the difference between the angles is reduced to zero to preserve the balance.

Navigation, Sensing & Control

In some cases, the housing 405 may comprise one or more slots or openings for a sensor or sensing device 430. Further, the sensing device 430 (e.g., camera, or object detection device) may be installed such that it is aligned or substantially aligned with the one or more slots or openings. In some examples, there may be a slot or opening on each side or edge of the housing, allowing a 360-degree field of view at the MITU 400. In some embodiments, one or more edges of the housing 405 (e.g., front edge) may comprise an additional opening behind which one or more other sensors (e.g., a LIDAR sensor) may be installed.

MITU 400 includes control device 410. Control device 410 locally controls the autonomous movement of MITU 400 in response to multiple inputs. Control device 410 includes a control unit which incorporates software and hardware into autonomous control of MITU 400. Control device 410 may be in communication with multiple other systems including one or more central systems (e.g., warehouse system, retail system), transportation systems (e.g., vehicles or transportation providers utilized to relocate the MITU from one geographic site to another), or even other MITUs or smart rack robots, to control the movement of MITU 400 in response to these systems' requirements. In some cases, such communication may be facilitated via Wi-Fi, Bluetooth, Near Field Communication (NFC), Cellular, Radio, or any other means.

Control device 410 is also in communication with sensing device 430 and responds to physical objects detected by the sensing device 430, for instance. Control device 410 is also in communication with drive device 401 to control the movement of MITU 400. In some cases, control device 410 may include an analog to digital (ADC) converter to convert analog readings (or signals) from the various sensors into digital signals and may also incorporate a feedback loop. As an example, MITU 400 may be configured to travel in a straight-line while being surrounded on both sides by other objects (e.g., robots, shelves, etc.), a typical scenario inside a warehouse. Further, the control device 410 may receive information pertaining to the objects from the sensing device 430. In some cases, the sensing device 430 may comprise one or more infrared object detectors that can measure the distance from the left and right sides of the MITU 400 to the objects. The sensing device 430 may create a continuous analog voltage that depends inversely on the distance to the objects. In some cases, the analog voltage may be passed on to the ADC converter in the control device 410, following which the control device 410 computes an error (e.g., a difference between readings from the left and right sides of the robot), and adjusts the inputs to the drive device 401 until the error is reduced to zero.

MITU 400 includes navigation device 420, wherein the navigation device 420 determines the physical position of MITU 400 and communicates the location data to the control device 410. Navigation device 420 may incorporate a variety of methods of location identification including one or more of Global Positioning System (GPS), 802.11 Wi-Fi, Cellular, Quick Response (QR) codes, barcodes, Radio-Frequency Identification (RFID), Near Field Communication (NFC), magnetic positioning, Ultra-wide band (UWB), ultrasound, etc. While GPS and cellular methods of location identification suffice for outdoor applications, they lack accuracy and reliability indoors, especially in large multi-story buildings (e.g., warehouses, hotels, office buildings), airports, parking garages, and underground locations. In such cases, alternate techniques and devices may be utilized to provide indoor position, which may range from Wi-Fi and Bluetooth antennas to purpose-built installations with relays and beacons.

In some other cases, QR codes or barcodes may be affixed to known locations inside the warehouse or indoor structure navigated by the MITU 400. For instance, a MITU 400 navigating within a warehouse or building may be able to determine its location based on scanning and decoding the QR codes. In some cases, the MITU 400 may be aware of the QR code associated with an end point within the warehouse. In such cases, the MITU may navigate (e.g., in straight lines between QR codes), until the end point is reached. In one example, localization of the MITU 400 may be determined from odometry readings gathered from the drive device 401. For instance, the control device 410 or the drive device 401 may maintain an accurate count of the number of times the drive device 401 or a motor turning the wheels has turned. Further, since the diameter of the wheel and the starting point is known, the localization of the MITU 400 may be determined by calculating straight line distances between two adjacent points. As an example, if MITU 400 is navigating between a starting point A and an ending point F, via intermediate points B, C, D, and E, the control device 410 or drive device 401 may compute the number of times the drive device 401 needs to turn in order to ensure MITU 400 reaches point B, recalculates the number of times the drive device 401 needs to turn to reach point C (i.e., once point B is reached), and so on. In some cases, the MITU 400 may determine it has reached an intermediate point based on scanning a QR code at that point. In some examples, the QR codes may be affixed to the floor, on the ceiling, or another known location. Further, the QR codes may be visible (e.g., printer ink) or invisible (e.g., UV ink, infrared ink, etc.) to the naked human eye. In some cases, a camera, or QR code or barcode reader on the MITU 400 may be configured to scan and identify codes painted in ink invisible to the human eye. Additionally, or alternatively, the MITU 400 may comprise one or more infrared LEDs for illuminating targets, which can then be identified by the camera or QR code reader. It should be noted that this camera or barcode reader may be the same as, or in addition to the camera and barcode reader utilized by the inventory storage device 450, described above.

MITU 400 includes sensing device 430. Sensing device 430 responds to physical object(s) in the vicinity of MITU 400. Sensing device 430 may incorporate a variety of sensing methods, such as, but not limited to, visual or infrared cameras, LIDAR, Radar, Laser, and/or ultrasound (or ultrasonic). Sensing device 430 communicates the physical object data to control device 410. Single or multiple camera configurations may be incorporated in order to provide stereo camera implementations, for instance, to obtain depth information. In some cases, the sensing device 430 may generate a 3D virtual rendition of the warehouse or building to assist MITU 400 during navigation. In some circumstances, the MITU 400 may combine the 3D virtual model of its navigating environment with real data, such as, but not limited to, physical building measurements, real-time acquired robot's position (i.e., based on rotation of wheels, QR codes, etc.), and data acquired from scanning (e.g., laser, LIDAR, radar, etc.) to further enhance and visualize object detection for navigation. In some other cases, the sensing device 430 may deploy a technology, referred to as Simultaneous Location and Mapping (SLAM), where data from multiple sensors may be fused together to enable the MITU 400 to locate itself in a predetermined map without the use of fixed markers (e.g., QR codes, beacons, RFID tags, etc.).

Power

MITU 400 includes power device 440, wherein power device 440 supplies power to various components of MITU 400. Power device 440 may be in electrical communication with one or more of the drive device 401, control device 410, navigation device 420, sensing device 430, and inventory storage device 450. In some cases, power device 440 may be a battery, a fuel cell, and/or a solar cell, to name a few non-limiting examples. In other embodiments, inductive charging or magnetic resonance charging (i.e., wireless power transfer) may be utilized, which may allow the robot or MITU 400 to charge while moving, such as when the robot is moving up and down aisleways, or when MITU 400 is loaded on the transport vehicle. In such cases, the MITU 400 may not need to dock to a charge station. In some cases, inductive charging plates may be installed in transport vehicles, warehouses, retail stores, etc., that the MITU 400 may park on for wireless transfer of power. Additionally or alternatively, the MITU 400 may be configured to receive power from one or more recharge or power outlets installed on the transportation system. In some examples, a transportation system, such as a truck, may comprise a plurality of power outlets (or charging ports) for charging one or more MITUs. In some cases, the battery of the MITU 400 may be removable. In such cases, the MITU 400 or a human operator may replace the drained battery with a charged one.

In some embodiments, MITUs or autonomous smart rack robots may behave not just as individual devices, but like a swarm of devices. For instance, the power device 440 of MITU 400 may be operationally configured to request power from or relay power to another MITU in its vicinity. In some examples, such power transfer may be achieved via power connectors, such as male/female connectors or magnetically attachable power connectors located on the MITUs. In some other cases, the MITU 400 may request to use a power supply/outlet when it is running low on power, for instance, when another autonomous storage unit is already using the said power supply and has reached a sufficient level of charge. In some cases, a swarm of MITUs may be configured to tightly pack themselves, which serves to not only reduce floor space, but also the number of charge points needed. In some circumstances, floor mounted recharge plates may be installed on warehouse floors or on the floor of the transportation system to propagate power to a large number of tightly packed MITUs.

In yet other cases, the power device 440 may comprise one or more solar panels coupled to a battery source, which may allow the MITU 400 to operate in an environment with limited charging facilities. For instance, in some examples, the MITU 400 may be deployed as a vending machine in a public space, such as a town square, a sporting event, a street with heavy foot traffic, etc. Further, by equipping the MITU 400 with renewable energy harnessing capabilities, the MITU 400 may operate for longer durations without needing to be recharged. In some examples, a transportation system may drop off one or more MITUs 400 loaded with inventory at a public location. The MITUs 400 may serve as portable vending machines and may be configured to track their inventory, accept payments (e.g., credit card payments, NFC payments, cryptocurrencies, etc.), and communicate with other MITUs and/or transportation systems. In some cases, the transportation system may pick up one or more of the MITUs, for instance, when their inventory is depleted or power level is under a threshold, or after a pre-defined time. In one non-limiting example, a MITU may be dropped off along a street and instructed to sell all its inventory or until its power level falls under a threshold (e.g., 20% charge), whichever is earlier. In such cases, the MITU may attempt to sell its inventory in the pre-defined area and signal to a transportation system once the objectives have been met, or its power level falls below the threshold. The transportation system may then collect the MITU at or near the original drop off location on the street, or another location pre-negotiated with the MITU. After boarding the transportation system, the MITU may recharge (e.g., via a charging port, battery swap) and resume its mission. Alternatively, if the MITU has sold all its inventory, the MITU may be transported back to a warehouse/distribution center where it may be loaded with additional inventory. In yet other cases, the MITU may be configured to transfer its remaining inventory to a charged MITU on the transport system. The charged MITU may then disembark from the transport system and resume the mission, for instance.

Figure 5:
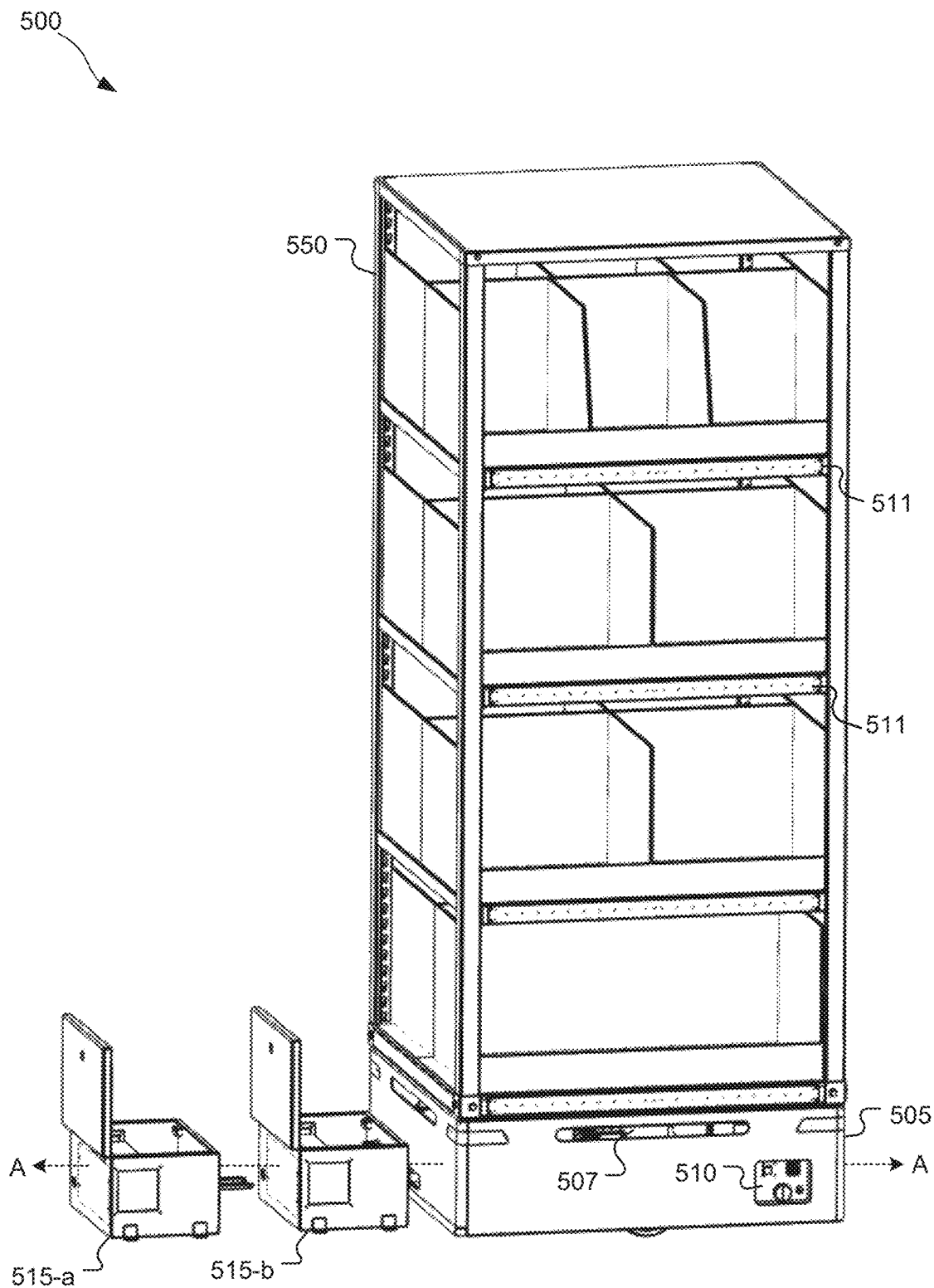
FIG. 5 is a side view of the MITU in FIG. 4, in accordance with one or more implementations.

FIG. 5 illustrates a side view of a MITU 500, in accordance with an alternate embodiment of the disclosure. In some cases, MITU 500 may be similar to or substantially similar to MITU 400, as described with reference to FIG. 4. Further, MITU 500 may include one or more of its sub-components. For instance, MITU 500 may comprise a robot portion, including at least a drive device, a balance device, a control device, a navigation device, a sensing device, and a power device. Further, the MITU 500 may comprise a structural portion including at least housing 505 and inventory storage device 550. As shown, in some examples, the robot portion of the MITU 500 may be shaped like a cube, a cuboid, a cylinder, or any other shape, and may comprise one or more wheels and balance devices on its lower portion. In some other cases, the robot portion may be surrounded by, or substantially surrounded by the housing 505. Further, the robot portion may be in electronic communication (either wired or wireless) with the housing device 505 and/or the inventory storage device 550. In some cases, inventory storage device 550 may also comprise one or more lights 511, where the lights 511 may be LEDs.

In some examples, the housing 505 may comprise one or more slots 507 on one or more sides/faces behind which a sensing device may be placed. In some cases, housing 505 may also comprise one or more manual interfaces 510. Further, the manual interface 510 may be a manual power switch through which a user can turn the autonomous storage unit or MITU on/off. In some other cases, the manual interface 510 may comprise one or more connectors (i.e., metallic, conductive, or magnetic), which may be used to dock the MITU to a power outlet or an external charging station, for instance, in a warehouse, transport system, maintenance center, etc. In some examples, the MITU 500 may be configured to navigate autonomously to a charging station when its battery or power level falls below a threshold (e.g., 10%, 20%, etc.). In other cases, the MITU 500 may swap its battery for a charged one. In some cases, the MITU 500 may be configured to swap its battery autonomously. Alternatively, a human operator may be needed to perform the battery swap. As noted above, the MITU 500 may comprise solar panels or other means of harnessing renewable energy, which may enable the MITU 500 to operate in environments with limited charging capabilities.

As shown, in some embodiments, the housing portion of MITU 500 may comprise one or more detachable climate-controlled units 515-*a*, 515-*b* that can slide in and out of the MITU. In some examples, these climate-controlled units 515 may be electrically connected to the power device and may be capable of both heating and cooling. In other cases, the inventory storage device 550 of MITU 500 may also be climate controlled. In such cases, the MITU 500 may be capable of transporting hot and cold items (e.g., food, beverages, medicines or vaccines, etc.).

In one example, upon loading the climate-controlled units 515, the MITU 500 may be specified a certain goal temperature (or temperature range) for those items. In some embodiments, climate-controlled units 515 may comprise one or more electronic temperature sensors (not shown) for real-time monitoring. In such cases, the climate-controlled units or the control device of the autonomous storage unit may adjust the internal temperature to stay within the specified range based in part on readings obtained from the electronic temperature sensors. In some embodiments, climate-controlled units 515-*a* and 515-*b* may be specified different goal temperatures (e.g., one unit may be used for cooling, and the other for heating). In such cases, the MITU or autonomous storage unit may leverage its inbuilt power and control functionality to maintain the units at their respective desired goal temperatures. In yet other cases, the MITU 500 may not be specified a goal temperature for items placed in the climate-controlled units 515 and may identify an appropriate temperature based on determining information pertaining to the one or more loaded items (e.g., via SKUs, RFID tags, barcodes, etc. of the items). In some cases, MITU 500 may be configured to communicate any deviations in temperature outside the specified range to a central system or controller. Upon receiving an alert from the autonomous storage unit or MITU 500, corrective actions may be implemented by one or more of the MITU 500 or the central system. For example, the MITU 500 may receive instructions from the central system to raise or reduce the specified temperature ranges based on the central system determining faulty temperature sensor readings. In other cases, the MITU 500 may be redirected to the closest storage facility or warehouse for a diagnosis check, optionally offload its inventory to a functioning autonomous storage unit, and/or evaluate the condition of its inventory. In this way, the corrective action may be implemented at the MITU 500 in a timely manner, which may also serve to minimize financial losses. In some embodiments, after offloading its inventory to the functioning autonomous storage unit, the MITU 500 may also provide it with instructions on completing the remainder of the mission.

FIG. 6 illustrates an example of a mobile inventory transport communication network 600 on a transportation system. In some cases, the mobile inventory transport communication network 600 may include a plurality of MITUs 650 (e.g., a first MITU 650-*a*, a second MITU 650-*b*, a third MITU 650-*c*, a fourth MITU 650-*d*, and a fifth MITU 650-*e*)

loaded on to a transportation system, such as a truck. In some embodiments, the MITUs 650 may be examples of MITUs 400 and/or 500 as described in relation to FIGS. 4-5. Further, MITUs 650 may be in communication with each other and/or the transportation system via Bluetooth, Wi-Fi, Cellular, Radio, or any other wired or wireless means of communication. In some other cases, the MITUs 650 may be in communication with a transport controller (e.g., on the transportation system, or elsewhere), where the transport controller may be implemented using a server or computing platform (e.g., shown as server 102, computing platform 104 in FIG. 1). In some cases, the MITUs 650 may be configured to be controlled by a human operator, such as a driver of the transportation system, using an app installed on a mobile device (e.g., smart phone, tablet, etc.).

As described below, communications between MITUs 650 may facilitate their reorganization on transport systems, for instance, in response to an inventory demand at a new destination. In some cases, drop-off locations for MITUs 650 may be pre-negotiated between one or more of the MITUs 650, a central controller, a transport controller, and a transportation system. In some cases, the drop-off locations may be negotiated prior to boarding at the original location (e.g., warehouse). Further, boarding orders for the MITUs 650 may be based on their respective dropoff locations. For instance, an autonomous storage unit, such as MITU 650-*a*, offloading at a later destination on the route may be boarded earlier, which may allow autonomous storage units, such as MITUs 650-*d* and 650-*e*, disembarking earlier to be closer to the transport system's exit (e.g., shown by exit path 604).

As illustrated, MITUs 650 may be packed tightly together on the transportation system, where dotted boundaries 601-*a* and 601-*b* represent the physical edges (e.g., side walls) of the transportation system. One or more of the MITUs 650 may have empty spots adjacent to them (e.g., shown as empty spot 607-*a* and 607-*b* adjacent MITUs 650-*b* and 650-*d*, respectively), for instance, to allow reorganization during transit and/or to allow one or more other MITUs to board the transportation system. In other cases, the empty spots may comprise charging ports (e.g., shown as charging ports 606-*a* and 606-*b* adjacent MITU 650-*a*) to allow MITUs 650 to charge during transit. Some non-limiting examples of charging ports 606 include resonant inductive coils or plates, and power outlets (e.g., 24V, 110V, etc.). In some circumstances, the transportation system or transport controller may receive an update from a central controller, such as a warehouse controller, to deliver a MITU 650 to a destination other than the one previously negotiated, for instance, based on an urgent inventory demand at the new destination. In this example, the transport controller receives an update regarding a new dropoff location for MITU 650-*a*. In some cases, the warehouse controller may also identify MITU 650-*a*, for instance, via a storage unit identification number. In such cases, the transportation system updates its current destination to the new destination and reroutes to the new destination. Furthermore, the transportation system may also transmit an indication to MITU 650-*a* to alert it that its destination has been updated. In some circumstances, MITU 650-*a* may attempt to rearrange itself closer to the transport system's exit (e.g., shown as exit path 604) based on receiving the alert from the transportation system.

As illustrated, MITU 650-*a* is blocked behind MITUs 650-*b* and 650-*d*. Furthermore, MITU 650-*a* may communicate with the one or more MITUs 650 around it and transmit an indication that its drop-off destination has been updated. In other cases, the one or more other MITUs 650 may be instructed by the transport system to create a path for MITU 650-*a* to reach the transport system's exit. As illustrated, upon receiving the indication from MITU 650-*a*, MITU 650-*b* may relocate to the left (e.g., shown as move left 602) into empty spot 607-*a*, while MITU 650-*d* may relocate to the right (e.g., shown as move right 603) into empty spot 607-*b*, thus creating a path for MITU 650-*a*. In some cases, similar principles described in relation to FIG. 6 may be applied for reorganizing autonomous robots or MITUs in warehouses, retail stores, or any other applicable location.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. An autonomous inventory management system, the system comprising:
   one or more hardware processors configured by machine-readable instructions to:
   direct a first transport system to a first location, wherein the first transport system is configured to transport one or more autonomous storage units from the first location, and wherein each of the one or more autonomous storage units comprises:
   a housing,
   an inventory storage device physically coupled to the housing, and configured to transport at least one inventory item,
   a power device, wherein the power device is operationally configured to supply power to electrical components of the autonomous storage unit,
   a drive device in electrical communication with the power device, the drive device operationally configured to physically move the autonomous storage unit in one or more control territories,
   and one or more of:
   a navigation device operationally configured to transmit and receive geographic data and determine a physical location of the autonomous storage unit,
   a sensing device operationally configured to detect physical objects and transmit and receive physical object data, and
   a control device, wherein the control device is in electronic communication with the power device, the drive device, and one or more of the navigation device and the sensing device, and is operationally configured to control the autonomous storage unit;
   and wherein the one or more hardware processors are further configured by machine readable instructions to:
   determine a respective drop off location for each of the one or more autonomous storage units, wherein the drop off location is different from the first location;
   determine a boarding order for the one or more autonomous storage units based at least in part on the respective drop off location for each of the one or more autonomous storage units;

direct the one or more autonomous storage units to board the first transport system at the first location, the directing based at least in part on the boarding order; and transport the one or more autonomous storage units from the first location to the one or more respective drop off locations.

2. The system of claim 1, wherein the one or more hardware processors are further configured by machine-readable instructions to:

direct at least one autonomous storage unit to depart the first transport system at the respective drop off location.

3. The system of claim 1, wherein the first location is one of a first distribution center, a first retail location, a first residential property, a first street address, a first Global Positioning System (GPS) coordinate, or a first maintenance center.

4. The system of claim 3, wherein the drop off location is one of a second retail location, another maintenance center different from the first maintenance center, a second residential property, a second street address, a second GPS coordinate, or another distribution center different from the first distribution center.

5. The system of claim 1, wherein the first transport system comprises a wireless control system configured to communicate with the one or more autonomous storage units and one or more central servers, and wherein the first transport system confirms an identity for each of the one or more autonomous storage units prior to receiving the one or more autonomous storage units.

6. The system of claim 5, wherein the first location comprises a first central server, and wherein the first central server is a host central server.

7. The system of claim 6, wherein each drop off location comprises at least one central server.

8. The system of claim 7, wherein the one or more hardware processors are further configured by machine-readable instructions to:

register, for at least one autonomous storage unit, an autonomous storage unit boarding event with the host central server; and register, for the at least one autonomous storage unit, an autonomous storage unit departure event with the at least one central server at the respective drop off location, wherein registering the autonomous storage unit departure event is based at least in part on determining a departure of the at least autonomous storage unit from the first transport system.

9. The system of claim 8, wherein the one or more hardware processors are further configured by machine-readable instructions to:

register, for the at least one autonomous storage unit, the autonomous storage unit departure event with the host central server at the first location.

10. The system of claim 1, wherein determining the boarding order for the one or more autonomous storage units is based at least in part on a drop off priority order for the one or more autonomous storage units.

11. The system of claim 1, wherein the at least one inventory item comprises a respective autonomous storage unit.

12. A method of controlling an autonomous inventory management system, comprising:

directing a first transport system to a first location, wherein the first transport system is configured to transport one or more autonomous storage units from the first location, and wherein each of the one or more autonomous storage units is configured to transport at least one inventory item;

determining a respective drop off location for each of the one or more autonomous storage units, wherein the drop off location is different from the first location;

determining a boarding order for the one or more autonomous storage units based at least in part on the respective drop off location for each of the one or more autonomous storage units;

directing the one or more autonomous storage units to board the first transport system at the first location, the directing based at least in part on the boarding order; and transporting the one or more autonomous storage units from the first location to the one or more respective drop off locations.

13. The method of claim 12, further comprising:

directing at least one autonomous storage unit to depart the first transport system at the respective drop off location.

14. The method of claim 12, wherein the first location is one of a first distribution center, a first retail location, a first residential property, a first street address, a first Global Positioning System (GPS) coordinate, or a first maintenance center.

15. The method of claim 14, wherein the drop off location is one of a second retail location, another maintenance center different from the first maintenance center, a second residential property, a second street address, a second GPS coordinate, or another distribution center different from the first distribution center.

16. The method of claim 12, wherein the first transport system comprises a wireless control system configured to communicate with the one or more autonomous storage units and one or more central servers, and wherein the first transport system confirms an identity for each of the one or more autonomous storage units prior to receiving the one or more autonomous storage units.

17. The method of claim 16, wherein the first location comprises a first central server, and wherein the first central server is a host central server.

18. The method of claim 17, wherein each drop off location comprises at least one central server.

19. The method of claim 18, further comprising:

registering, for at least one autonomous storage unit, an autonomous storage unit boarding event with the host central server; and registering, for the at least one autonomous storage unit, an autonomous storage unit departure event with one or more of the host central server at the first location and the at least one central server at the respective drop off location, wherein registering the autonomous storage unit departure event is based at least in part on determining a departure of the at least autonomous storage unit from the first transport system.

20. A non-transient computer-readable storage medium having instructions embodied thereon, the instructions being executable by one or more processors to perform a method for controlling an autonomous inventory management system, the method comprising:

directing a first transport system to a first location, wherein the first transport system is configured to transport one or more autonomous storage units from the first location, and wherein each of the one or more autonomous storage units is configured to transport at least one inventory item;

determining a respective drop off location for each of the one or more autonomous storage units, wherein the drop off location is different from the first location;

determining a boarding order for the one or more autonomous storage units based at least in part on the respective drop off location for each of the one or more autonomous storage units;

directing the one or more autonomous storage units to board the first transport system at the first location, the directing based at least in part on the boarding order; and transporting the one or more autonomous storage units from the first location to the one or more respective drop off locations.

* * * * *